United States Patent
Fafard

(10) Patent No.: US 8,190,386 B2
(45) Date of Patent: *May 29, 2012

(54) APPARATUS AND METHOD TO CHARACTERIZE MULTIJUNCTION PHOTOVOLTAIC SOLAR CELLS

(75) Inventor: Simon Fafard, Ottawa (CA)

(73) Assignee: Cyrium Technologies Incorporated, Ottawa, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 13/230,919

(22) Filed: Sep. 13, 2011

(65) Prior Publication Data

US 2012/0004868 A1    Jan. 5, 2012

Related U.S. Application Data

(63) Continuation of application No. 13/118,533, filed on May 30, 2011, now Pat. No. 8,073,645.

(51) Int. Cl.
  *G01R 13/02*  (2006.01)
  *H01L 31/042* (2006.01)
(52) U.S. Cl. ............. 702/64; 136/249; 136/255; 702/65
(58) Field of Classification Search .......... 702/57, 702/64, 65, 60; 136/246, 249, 252, 255, 136/256, 262
See application file for complete search history.

(56) References Cited

U.S. PATENT DOCUMENTS

| | | | |
|---|---|---|---|
| 5,223,043 A | 6/1993 | Olson et al. | |
| 6,316,715 B1 | 11/2001 | King et al. | |
| 2011/0246109 A1* | 10/2011 | Fafard | ............... 702/64 |

OTHER PUBLICATIONS

Adelhelm et al., "Performance and parameter analysis of tandem solar cells using measurements at multiple spectral conditions", Solar Energy Materials and Solar Cells, 1998, pp. 185-195.
Meusel et al., "Spectral Mismatch Correction and Spectrometric Characterization of Monolithic III-V Multi-junction Solar Cells", Progress In Photovoltaics: Research and Applications, Jan. 28, 2002, pp. 243-255.
Guter et al., "I-V Characterization of Tunnel Diodes and Multi-junction Solar Cells", IEEE Transactions on Electron Devices, vol. 53, No. 9, Sep. 2006, pp. 2216-2222.
Bliss et al., "Towards an Accurate and Automated Characterisation of Multi-Junction Solar Cells", 5th Photovoltaic Science Applications and Technology Conference (PVSAT-5), Wrexham, UK, Apr. 1-3, 2009, 4 pages.
Lim et al., "Analysis of Spectral Photocurrent Response from Multi-Junction Solar Cells Under Variable Voltage Bias", 35th Photovoltaic Specialists Conference (PVSC), Honolulu, HI, Jun. 20-25, 2010, 14 pages.
PCT Application No. PCT/CA2011/050674, Written Opinion dated Feb. 7, 2012.

* cited by examiner

*Primary Examiner* — John H Le
(74) *Attorney, Agent, or Firm* — Louis B. Allard; Borden Ladner Gervais LLP

(57) ABSTRACT

An apparatus and method to electrically and optically characterize a multijunction solar cell. The apparatus can have as many light sources as there are subcells in the multijunction solar cell. Each light source has an optical spectrum that falls within the bandgap energy of a corresponding subcell. Each light source has a controllable intensity level.

6 Claims, 31 Drawing Sheets

APPARATUS AND METHOD TO CHARACTERIZE MULTIJUNCTION PHOTOVOLTAIC SOLAR CELLS

CROSS REFERENCE TO RELATED APPLICATIONS

This application is a continuation of U.S. application Ser. No. 13/118,533, filed May 30, 2011 and incorporated herein by reference in its entirety.

FIELD

The present disclosure relates generally to the field of photovoltaic solar cells and the characterization thereof. In particular, the present disclosure relates to the characterization of the electro-optical performance response of high-efficiency multijunction solar cells having more than one sub-cells connected in series and which can be used for power generation in satellites as well as for terrestrial concentrated photovoltaic (CPV) applications.

BACKGROUND

Photovoltaic solar cells are used to convert sunlight energy into electricity by absorbing, using semiconductor materials, photons having an energy larger than the semiconductor bandgap, the absorption of photons causing the generation of photocarriers (electrons and holes).

The electrons and holes are separated across a p/n junction that has been formed by doping adjacent regions of the semiconductor. Single junction solar cells have one p/n junction. It is well-known that the solar energy conversion efficiency of single-junction solar cells is limited due to the fact that the Sun emits photons in a broad range of wavelengths/energies, whereas the one p/n junction of a single junction solar cell has only one fixed bandgap energy. The solar photons with an energy equal or slightly greater of the bandgap of the semiconductor are absorbed and converted into electricity efficiently. However, photons with excessive energy compared to the bandgap of the single junction solar cell waste their excess energy and, photons with less energy than the bandgap of the single junction solar cell are not absorbed.

It is also known that higher conversion efficiencies can be obtained with photovoltaic solar cell devices that have multiple p/n junctions electrically connected in series. Such devices are typically referred to as multijunction solar cells. A multijunction solar cell can have any number of p/n junctions; typically, it will have has 2, 3, or 4 p/n junctions, which can be referred to as subcells. In addition to the p/n junction itself, a high-efficiency subcell will typically incorporate other functional elements such as a window layer and a back surface field layer.

As a particular example, a three-junction solar cell (also referred to as a solar cell device or, simply as a device) has three subcells, which can be referred to as a top cell (TC), a middle-cell (MC), and a bottom cell (BC). The three subcells are typically electrically connected to each other in series using tunnel-junctions, metal layers, or other equivalent components. Each subcell has a respective bandgap, which is chosen in accordance with the solar spectrum of interest and with the goal of optimizing the conversion efficiency of the three-junction solar cell (e.g., see U.S. Pat. No. 7,863,516 incorporated herein by reference in its entirety).

The subcells can be grown monolithically by epitaxy or assembled mechanically. In either case, the subcells generating the least photocurrent will be limiting the overall current that the multijunction solar cell can generate because the subcells are connected in series. As such, when measuring the performance metrics (e.g., the electrical, optical, electro-optical characteristics) of multijunction solar cells, the individual performance metrics of the constituent subcells are often concealed and/or not easily quantifiable with currently available test apparatus.

As will be understood by the skilled worker, the measurement and characterization of all the performance metrics of each individual subcell is desirable and can be important in order to better optimize the performance of multijunction solar cells.

In the prior art, a technique exists for determining the spectral response of a multijunction solar cell. The technique is typically referred to as the quantum efficiency (QE) measurement, also known as internal quantum efficiency (IQE) or external quantum efficiency (EQE) depending on whether or not the light reflected from the device or other shadowing effects are taken into account. The QE measurement for a single junction device is straightforward and the prior art technique is typically adequate for single junction cells. In that case, monochromatic light illuminates the solar cell and the solar cell's response is measured for the spectral range of interest. However, for the QE measurement of multiple-junction cells, the monochromatic light is absorbed by only one of the subcells while the other subcells generate no photocurrent due to the mismatch between the probe photon energy and the absorption characteristics of other subcells.

This results in no overall photocurrent due to the series connection of the subcells, and it is therefore not possible to measure the QE of the individual subcells by simply scanning the wavelength of the probe light in such a multijunction configuration. Instead, in order for the QE of the different subcells of a multijunction device to be measured, a light bias and/or a voltage bias needs to be applied to the other subcells that are not being probed optically (see for example Woodyard et al, Proceedings 25th PVSC, May 13-17, 203-206, 1996). However, the choice of the intensity of light used to bias the other subcells in the QE measurement, or the choice of the voltage bias used simultaneously can affect the results unpredictably. Subjective choices of light and voltage bias settings during the QE measurement of multijunction cells can lead to erroneous results which can negatively impact the design cycle and deployment time of the multijunction solar cells.

Other techniques have also been developed in the past for multijunction cells to try to account for the spectral mismatch corrections of Sun simulators. An example of such a technique is described in Adelhelm et al. (Solar En. Mat. and Sol. Cells, 1998; 50: 185-195). Occasionally, such techniques involve mathematical procedures to evaluate the spectral mismatch correction, as described for example in Meusel et al. (Prog. Photovolt: Res. and Appl, 2002; 10:243-255). Typically, these techniques attempt to characterize the devices of interest with a Sun simulator, which attempts to match the overall Sun spectrum for spectral conditions typical close to AM1.5 direct, AM1.5 Global and/or AM0. Or the Sun simulator is adjusted to compensate for spectral corrections for the different subcells, such that each subcell generates the photocurrent that would be expected under the reference spectra of interest.

An effective irradiance can also be defined to characterize the spectra fidelity of the Sun simulator and the effective irradiance can be normalized or compared to the effective irradiance of the reference spectrum of interest to define measurement conditions that can help the interpretation of the performance data measured under such conditions. However, trial attempt measurements and multiple adjustments of the light and bias settings during the QE measurement, or other similar optical characterization techniques attempting to mimic spectral conditions close to a reference spectrum in the assessment of the performance of multijunction cells are time consuming and can still lead to erroneous results given that several combinations of light and voltage biases are possible.

As shown in the prior art above, it is particularly complicated because of the fact that precisely reproducing a reference spectrum is difficult and might still require additional characterization and mathematical procedures to evaluate the spectral mismatch correction. The corrections and adjustments are typically attempted without the full characterization of each constituent subcells of the multijunction cell, measured under well controlled illumination conditions, and without sweeping large enough ranges of illumination intensities in the subcells of interest. This is especially of concern in the cases of particular interest when the properties of some of the subcells are non-ideal due to material and/or fabrication issues.

Therefore, an apparatus capable of properly characterizing the individual performance metrics of the constituent subcells of multijunction photovoltaic solar cells is desirable.

SUMMARY

In a first aspect, the present disclosure provides a method to characterize a multijunction solar cell having subcells. The method comprises: illuminating, at varied light intensities, a particular subcell with light having a wavelength range that is within a spectral response range of the particular subcell, while illuminating, at a substantially fixed light intensity, each of the other subcells with light having a wavelength range that is within the spectral range of each of the other subcells, the particular subcell being one of the subcells; and measuring, at each of the varied light intensities, an electrical current flowing through the multijunction solar cell as a function of a voltage applied to the multijunction solar cell, the measuring to obtain current-voltage data characteristic of the multijunction solar cell.

The method can further comprise displaying the current-voltage data. Further, the method can comprise processing the current-voltage data to obtain processed data, the processed data representing, for the multijunction solar cell, at least one of an open-circuit voltage, a short-circuit current, a fill factor, a differential resistance, a maximum power current, and a maximum power voltage.

The processed data can further represents, for the particular subcell, an ideality factor, a saturation current, a shunting current, a responsivity, a series resistance, a reverse bias breakdown voltage, a reverse bias leakage current, a field induced parasitic current, and a wavelength-integrated quantum efficiency.

The fixed light intensity can be the same for each of the other subcells.

The light illuminating the particular subcell and the light illuminating the other subcells can be collimated light.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides an apparatus and method to measure the performance metrics of individual subcells in multijunction solar cells. The apparatus measures the current-voltage response (I-V curves) of the multijunction solar cell for different illumination conditions applied of the subcells of a multijunction solar cell. The apparatus allows to determine the fundamental parameters of each subcell, which affect the overall performance of the multijunction solar cell. The apparatus allows to measure performance metrics of multijunction solar cells of and of their constituent subcells. The performance metric can include, for example, the fill-factor parameter (FF), the open circuit parameter ($V_{oc}$), the short-circuit current ($I_{sc}$), the maximum power voltage ($V_{mp}$), and the maximum power current ($I_{mp}$). The performance metrics can also include, for the constituent subcells, the optoelectronic diode characteristics and parameters such as the ideality factor (n-factor), the saturation current ($I_o$), the shunting current ($I_{sh}$), the responsivity (R), the series resistance ($R_s$), the reverse bias breakdown voltage, the reverse bias leakage currents, the field-induced parasitic currents, and the wavelength-integrated quantum efficiency for each subcells. The apparatus and method of the present disclosure can be used to characterize multijunction solar cells having any number of subcells (p/n junction) formed therein.

Figure 1:
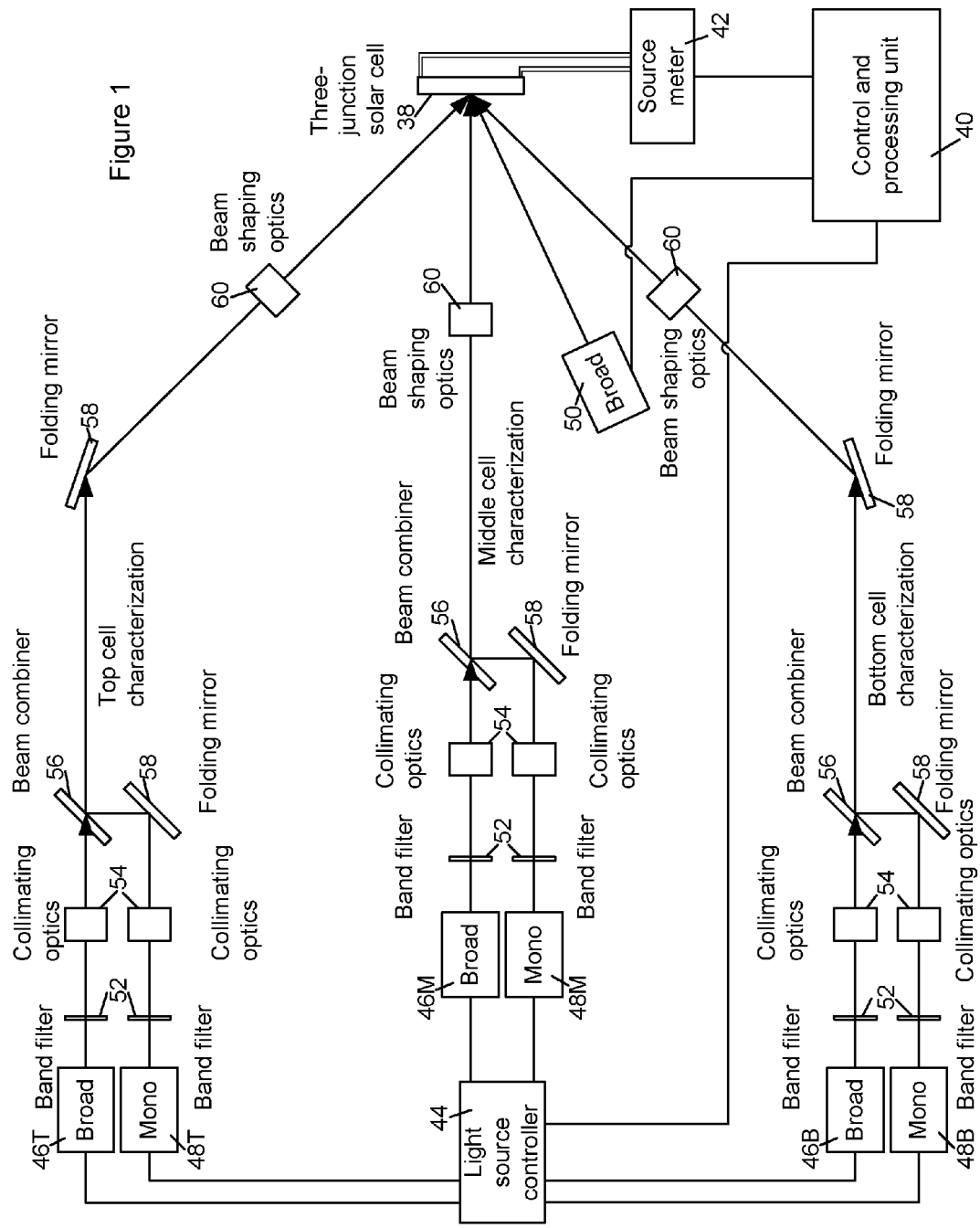
FIG. 1 shows an embodiment of an apparatus of the present disclosure.

An embodiment of a solar cell characterization apparatus of the present disclosure is shown in FIG. 1. FIG. 1 shows a three-junction solar cell 38, which includes a top cell (TC), a middle cell (MC), and a bottom cell (BC). In the present example, the top cell is the subcell that first receives light (sunlight) and through which light transmits to reach, successively, the middle cell and the bottom cell. The top cell has a bandgap energy larger than that of the middle cell, which is larger than that of the bottom cell. The exemplary characterization apparatus of FIG. 1 comprises: a TC-broadband light sourced 46T and a TC-monochromatic light source 48T, which can both be used to characterize the top cell; a MC-broadband light sourced 46M and a MC-monochromatic light source 48M, which can both be used to characterize the middle cell; and a BC-broadband light sourced 46B and a BC-monochromatic light source 48BT, which can both be used to characterize the bottom cell.

Each of the TC, MC, and BC has a wavelength range (and a corresponding bandgap energy) at which it can absorb light and generate electrical carriers (electrons and holes). The physical superposition (stacked configuration) of the subcells (TC, MC, and BC) can affect their effective spectral range, which is the wavelength response range for which a subcell will contribute photocurrent when photons are incident on the multijunction cell. This tends to occur because the upper subcells effectively filter some wavelengths away from the lower cells. This effect typically reduces the spectral range of the lower subcells when compared to what the spectral range of the lower subcells would be without the upper subcells stacked on top. As such, each subcell in a multijunction cell has a spectral range which is specific to its multijunction configuration and the bandgap properties of the semiconductors used in the various subcells.

In the embodiment of FIG. 1, each of the TC, MC, and BC has a pair of light sources associated thereto (TC: 46T, 48T; MC: 46M, 48M; and BC: 46B, 48B). The light for each of these light sources can be filtered by band filters 52 and collimated by collimating optics 54. The filtering can ensure that only light falling within the bandgap energy of the specific subcell is directed towards the subcell in question. Each pair of light sources can have associated thereto folding mirrors and beam combiners. For example, a folding mirror 58 associated with the light source 48T can be used to direct the light form the source 48T toward a beam combiner 56, which can also receive light form the light source 46T. The resulting combined beam can be directed to the solar cell 38 by another folding mirror 58. Beam shaping optics 60 can be used to properly shape the light beam prior to reaching the solar cell 38. Beam shaping optics can include a combination of converging or diverging lenses or mirrors, which can be spherical, cylindrical, parabolic, hyperbolic, as well as reflective or refractive elements or wave-guiding optics, apertures, or any other appropriate optical elements which can be used to control the shape, the size, the divergence, the achromatism, or other properties of interest of the beam.

Similarly, a folding mirror 58 associated with the light source 48M can be used to direct the light form the source 48M toward a beam combiner 56, which can also receive light form the light source 46M. The resulting combined beam can be directed to the solar cell 38 by another folding mirror 58. Beam shaping optics 60 can be used to properly shape the light beam prior to reaching the solar cell 38.

Further, a folding mirror 58 associated with the light source 48B can be used to direct the light form the source 48B toward a beam combiner 56, which can also receive light form the light source 46B. The resulting combined beam can be directed to the solar cell 38 by another folding mirror 58. Beam shaping optics 60 can be used to properly shape the light beam prior to reaching the solar cell 38.

As will be understood by a worker skilled in the art, in the embodiment shown at FIG. 1, the number of light sources required is commensurate with the number of subcells present in the multijunction solar cell.

In FIG. 1, three pairs of broadband and monochromatic sources are shown (46T, 48T; 46M, 48M; 46B, 48B). For each pair, either one the light sources, or both can be used simultaneously for each subcell. It is typically easier to produce more optical power with the broadband sources (46T, 46M, 46B); however, such spectrally broad sources can have a beam divergence that may not be as appropriate as that of a monochromatic source, such as, for example, a laser, which will typically be better collimated (low beam divergence). Further, the broadband source might cover a range of wavelength closer to the actual target spectrum that the device would normally see under operation (i.e., better spectral match) compared to a monochromatic source (48T, 48M, 48B), which will probe a narrow subset of that range. However, the monochromatic source can ensure that the light is absorbed substantially only in the intended subcell. The main considerations in deciding if a broadband or a monochromatic sources (or both) should be used include, but are not necessarily limited to, the following parameters: beam divergence, achromatism of the beam divergence, range of light intensity available, controllability of the intensity, stability of the intensity, uniformity and size of the beam spot achievable at difference powers, wavelengths or wavelength range available, the source availability and price, source expected lifetime, ability to calibrate and maintain the calibration of the source, source coherence, pointing accuracy, etc.

The broadband sources (46T, 46M, 46B) can be filtered to modify the spectral content, or the light intensity provided to the multijunction solar cell 38. This can be accomplished within the sources and/or together with the band filters 52. In addition to laser, monochromatic sources can also include, for example, narrow band sources such as high intensity light emitting diodes (LEDs), or SLEDs (superluminescent LEDs). For flash or pulsed light sources, other considerations include the pulse duration or pulse width, the spectral content and its stability within the pulse duration, the pulse to pulse stability and reproducibility, the variations of intensity profile through the duration of the pulse, the beam homogeneity and its temporal stability, the pulse repetition rate, or other temporal, spatial, or spectral considerations.

Additionally, another broad spectrum light source 50 with an optical spectrum width encompassing part or all of the spectral response of the three-junction solar cell 38 can be used, when appropriate, as background illumination. As an example, this can be used to verify the electro-optical response of the three-junction solar cell 38 under a specific reference spectrum.

Each of the light sources 46T, 48T, 46M, 48M, 46B, and 48B can be operationally connected by a light source controller 44, which can be controlled by a control and processing unit 40, which can also control the broad light source 50. For example, the light source controller can be used to adjust the power or intensity of the sources, or other aspect of the sources.

The light sources can be collimated by the collimating optics to have a good uniformity profile of their intensity distribution in a probe region of the light beam (the probe region being the portion of the beam that illuminates the multijunction solar cell 38). The intensity of the individual light sources can be adjustable over a wide range of user-controllable intensities. The intensity can be adjusted, for example, by optical filters, electrical parameters of the light sources (current, voltage), or any other suitable adjustment means.

Examples of light sources include, but are not limited to: arc-lamps such as xenon, mercury, sodium, krypton, deuterium, or any such lamps, incandescent lamps such as quartz tungsten halogen (QTH) lamps, LEDs, laser diodes, solid-state lasers, other type of lasers, sunlight, sunlight after concentration and/or filtering, or any combination of these sources or similar sources. The light sources can be filtered with the appropriate filters to eliminate the unwanted wavelengths from the source's output spectrum. The emission range of the individual light sources can be set to be absorbed by one subcell only, within the subcell spectral range of that subcell. Examples of filters are provided elsewhere in the present disclosure.

For clarity, each individual light source can be said to "excite", or "probe", predominantly only one of the respective subcells. Accordingly, in the embodiment of FIG. 1, the probe photons (the light) from the "TC-light source" (either or both of 46T and 48T) will be absorbed predominantly entirely in the semiconductor of the TC of the multijunction solar cell 38, and will not reach the MC or the BC. Further, the probe photons (the light) from the "MC-light source" (either or both of 46M and 48M) will go through the TC (the TC is transparent to the probe photons of the MC-light source) and will be absorbed substantially entirely in the semiconductor of the MC of the multijunction solar cell 38, and will not reach the BC. Similarly, the probe photons (the light) from the "BC-light source" (either or both of 46B and 48B) will go through TC and MC (the TC and the MC are transparent to probe photons of the BC-light source), and will be absorbed substantially entirely in the semiconductor of the BC of the multijunction solar cell 38.

The spot size of the light sources at the surface of the three-junction solar cell 38 can have a size smaller than the active surface of the solar cell, or a size bigger than the active surface of the solar cell (the active surface is the area of the illumination surface of the solar cell, it is typically between the busbars of the solar cell). In the former case the measurements controlled by the control and processing unit 40 can be calibrated from the spot sizes impinging on the solar cell. The three light sources can have a substantially equally-sized and spatially-overlapping spots. In the case where, the spot size is larger than the active surface of the multijunction solar cell, the measurements can be calibrated from the active area of the solar cell because the spots (light beams) are flooding entirely the active surface of the multijunction solar cell under test. The latter configuration can be advantageous to avoid maintaining a precise alignment of the various probe beams and calibrated measurements of the spot sizes; however, but both approaches are equally valid.

The light sources can be continuous, (continuous wave (CW)), light sources, or pulsed light sources. The apparatus can be setup to measure the performance metrics around one or several target intensities of interest. The target intensity of interest can be approximately the equivalent of 1 Sun (for example ~100 mW/cm$^2$) for 1 Sun characterization for space or CPV cells, or several hundred Suns primarily in the case of CPV cells.

For target intensities around or above 100 Suns, pulsed light sources can be used to illuminate the multijunction solar cell. The pulsed light sources can be selected or controlled to have a suitable duty-factor values to avoid thermal effects affecting the measurements and to maintain a measurement at a well-defined device junction temperature.

When performing characterization measurements of the a multijunction solar cell (e.g., the three-junction solar cell 38) with varying light intensity (as well as in constant intensity measurements), the multijunction solar cell temperature can be set at various temperatures of interest typically in the range of −270° C. to +150° C., more typically at 25° C. or closer to the typical operating temperature of the device in the range between 25° C. and 110° C. Any suitable type of temperature controller (not shown) can be operationally connected to the three-junction solar cell 38 and controlled by the control and processing unit 40.

In light intensity-dependent measurements, for a target light intensity, all except one of the light source can be set at the target intensity, and then the intensity output of the remaining light source can be swept through a range of intensities while keeping the others light sources at constant intensity. The range of intensity swept can be any range of interest around the target intensity. For example, the range can be set to cover from approximately $1/10$ of the target intensity to 10 times the target intensity. Wider or narrower ranges of probe intensities can be used without departing from the scope of this disclosure. Any adequate number of intensity step size can be chosen to acquire the data necessary to characterize the diode behavior of the subcell which is being probe with the light source of varying intensity.

Figure 2:
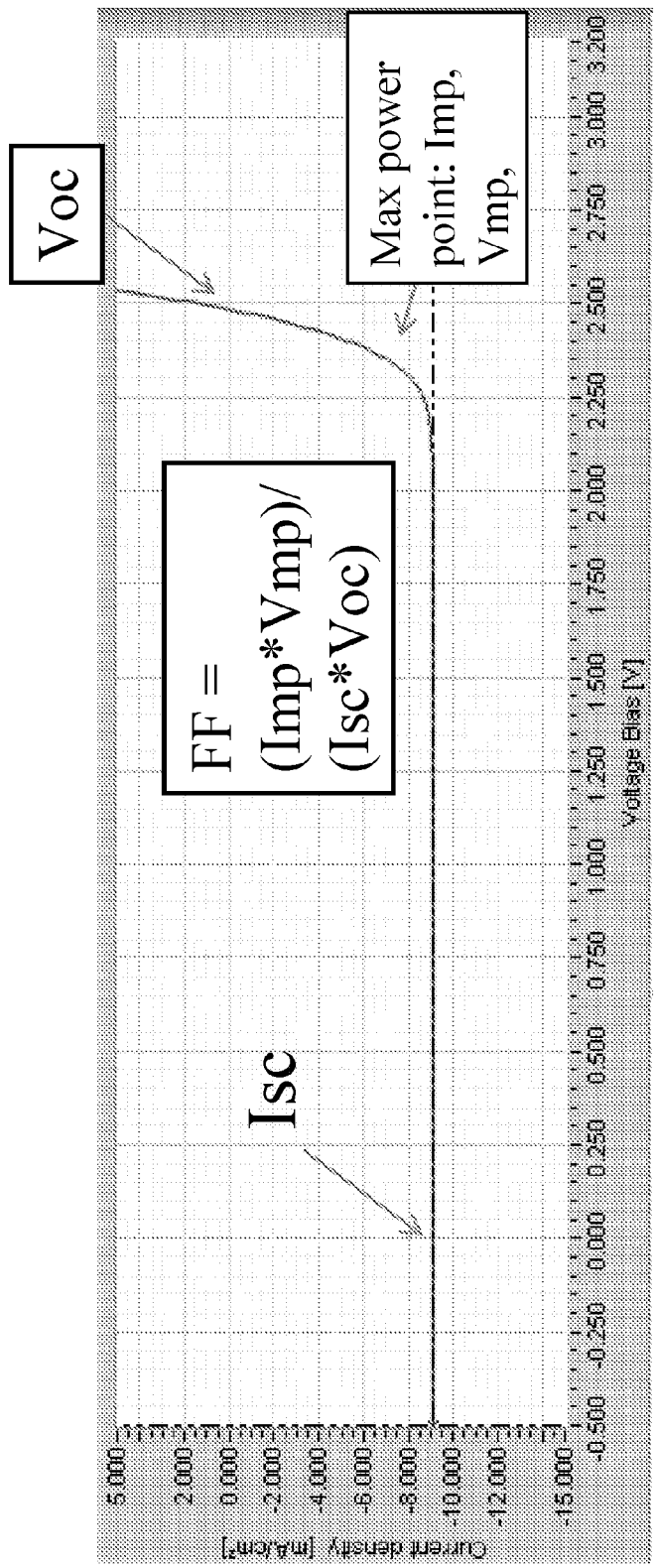
FIG. 2 shows an I-V plot of a three-junction solar cell, the plot having been acquired with the apparatus of FIG. 1.

For each intensity, the exemplary apparatus of FIG. 1 can measure and record the current vs. voltage (I-V) curve of the multijunction cell for that particular illumination condition. The apparatus can incorporate a source-meter 42 to measure the I-V curves. Any other appropriate equipment capable of applying and measuring a voltage bias and supplying and measuring the resulting current to the three-junction solar cell 38 can also be used. A four-wire probing technique can be used in order to eliminate any measurement artifacts introduced by the resistance of the probe wires. In this approach one pair of wires (current probes) is used to apply a voltage and pass a corresponding current through the multijunction solar cell while the voltage actually applied directly across the multijunction solar cell is measured separately. The voltage is measured as close as possible to the device terminals, for example on the busbars in the circuit of the current probes, to eliminate any voltage drop within the probe wires such as the current probes. The I-V curve can cover different voltage ranges depending on the accuracy desired and the time available for the measurements. The voltage range can span any suitable range such as, for example, the range from the $I_{sc}$ point to $V_{oc}$ point of the I-V curve. Because the $I_{sc}$ and $V_{oc}$ values will likely change in accordance with the varying light intensity illuminating the multijunction solar cell, the solar cell being tested, or other factors, a broader voltage range can be used An example of an I-V plot for a three-junction solar cell with a $V_{oc}$ of about 2.5V is shown as in FIG. 2. In this case, a desirable voltage range for the scan can be from −0.5V to +3.0V, which is depicted in FIG. 2. The step of the voltage scan can be set to different values depending on the precision required and the time available for the scan. Voltage steps of 5 mV can be adequate, but the apparatus can use larger or smaller voltage steps without departing from the scope of the present disclosure. The apparatus can scan the voltage from the lower values toward the higher values (i.e., positive voltage steps), or from the higher values to the lower values (i.e., negative voltage steps), or both consecutively to verify if there is any hysteresis in the multijunction solar cell in relation to the scan settings. For example, if the response time of the measuring electronics, or the acquisition parameters used, for example, the integration time, are too slow compared to the sweep time and the device response time, the positive and the negative voltage sweeps will give different results with an apparent offset, or hysteresis, depending on the direction of the scan (positive or negative voltage step size).

Figure 3:
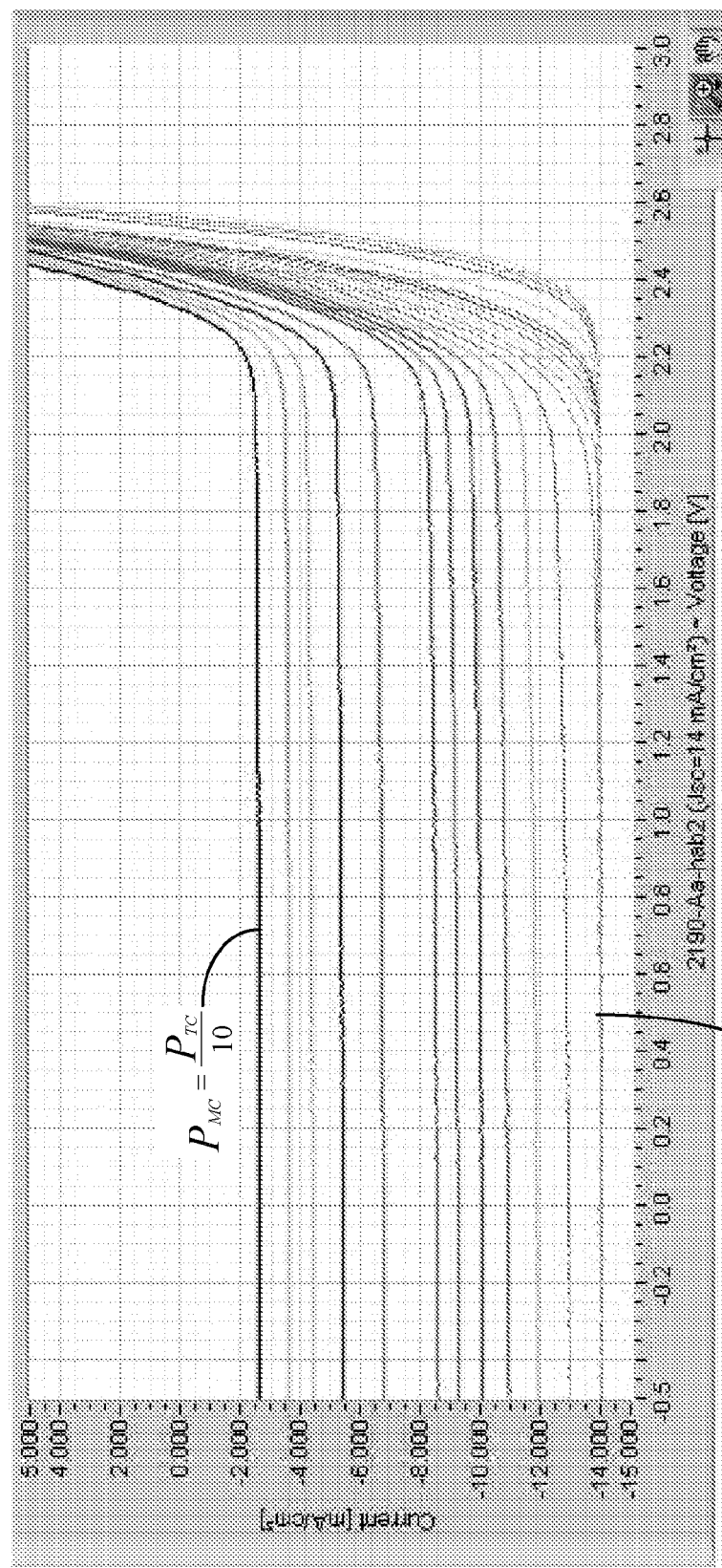
FIG. 3 shows multiple I-V plots at different illumination conditions, for first characterization parameters, for the same three-junction solar cell that is characterized at FIG. 2.

As another example, by keeping the TC source at a fixed intensity, at, for example an illumination power $P_{TC}=P_{14}$ giving an illumination intensity which produces substantially −14 mA/cm² of photocurrent in the TC subcell, and the BC source also fixed at say $P_{BC}=C*P_{TC}$ with for example C>1, at for example C~1.4, the MC source can be swept in intensity from $P_{MC}\sim 1/10*P_{TC}$ to $P_{MC}\sim 10*P_{TC}$ to produce multiple I-V plots as shown in FIG. 3. The setup conditions for FIG. 3 and its associated FIGS. 4 to 8 are: Green laser with an emission wavelength of about 532 nm is set to produce a TC photocurrent of −14.0 mA/cm² and $P_{BC}$ is obtained using a Quartz Tungsten Halogen (QTH) source, with a longpass filter set transmitting only the wavelengths greater than about 1000 nm, is set to obtain $P_{BC}\sim 1.4*P_{TC}$). An electrically-controllable intensity laser diode emitting at around 805 nm is used for the MC source. It can clearly be observed in FIG. 3 that the I-V curves have a characteristic behavior for $P_{MC}<P_{TC}$ in which case the three-junction solar cell is current-limited by the MC photocurrent (often referred to as "MC-limited" conditions), and for $P_{MC}>P_{TC}$ in which case the three-junction cell is current-limited by the TC photocurrent (often referred to as "TC-limited" conditions).

This can be clearly deduced for example by observing the evolution of the short circuit current, or in general the flat current values within voltage range between −0.5V to ~1.8V, with the intensity delivered to the MC. For increasing MC intensities giving here progressively between ~2.5 mA/cm² to −14.0 mA/cm², the overall measured three-junction short-circuit current increases progressively, therefore tracking and responding to the increase in the intensity delivered to the MC. For these conditions, the overall three-junction photocurrent is limited by how much photocurrent the MC can generate, i.e., MC-limited condition. As the intensity of the MC source is then progressively increased above the value that first produced a three-junction short-circuit current of −14.0 mA/cm², the three-junction short-circuit current clearly stops increasing and remains at a fixed value of −14.0 mA/cm². For these conditions, it can be said that the three-junction current is clamped at −14.0 mA/cm² by the current-limiting top cell. This is the case because the overall three-junction photocurrent is then limited by how much photocurrent the TC can generate, i.e., TC-limited condition. For these conditions, the three-junction short-circuit current cannot increase with the increased intensity delivered to the MC, but instead it can be seen that the $V_{oc}$ of the three-junction solar cell continues to progressively increase as well as the FF which also increases as the MC is over-driven with the excess intensity delivered to that subcell. Figuratively speaking, it is as if a "FF-bias" can be applied to the multi-junction cell.

It can also be noted that in the MC current-limiting conditions of the MC sweep, for any given fixed intensity of the MC source, the value of the measured three-junction current gives a quantitative measurement of the wavelength-integrated response of the MC. The latter is directly proportional to the quantum efficiency values of the MC for the wavelengths probed by the MC source. The exemplary apparatus of FIG. 1 can therefore be used to measure quantitatively the MC QE after proper calibrations. Further, the apparatus of the present disclosure has the advantage over a simple QE apparatus in that erroneous results can easily be avoided by inspecting the I-V curves for any anomalies instead of blindly setting the bias voltage and bias illumination conditions as is often done in QE measurements using the prior art. A qualitative and quantitative analysis of the progression of the $J_{sc}$, $V_{oc}$, FF, and other derived parameters as a function of the source intensity swept in a given subcell allows to understand the performance parameters (metrics), the underlying diode characteristics, and the quality of that subcell, as is shown in the following figures.

Figure 4:
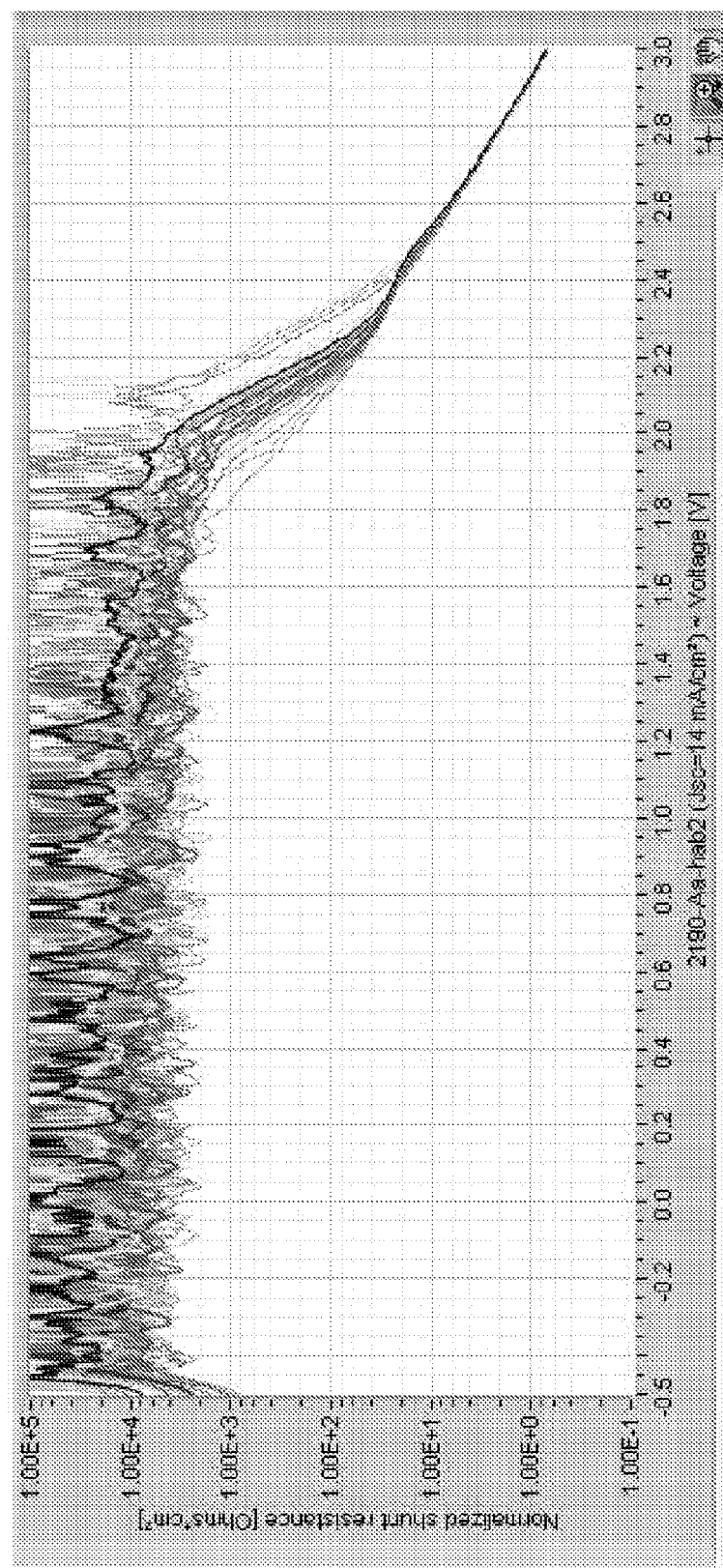
FIG. 4 shows, in accordance with the data shown at FIG. 3, plots of resistance as a function of voltage.

The same data set shown in FIG. 3 can be analyzed by plotting the differential resistance ($R_{diff}$) vs V as shown in FIG. 4. For example, this data can help identify, among other things, any shunting issues or series resistance issues. Shunting would typically be revealed in such measurements with lower than usual $R_{diff}$ values observed in what would usually be the normally high-impedance region of the I-V curves. For example, in FIG. 4, the predominantly horizontal part of the plots (plateaus), for voltages smaller than 1.8V, have $R_{diff}$ values in the $10^3$ Ohms-cm² to $10^5$ Ohms-cm² range. The $R_{diff}$ values of the plateaus typically depend on the illumination intensity, the cell size, and can also be instrumentation limited (for example, higher noise is observed in the data in the plateau region of FIG. 4). Lower than typical values for these plots would normally indicate a shunting issue, and typically a lower plateau would be observed corresponding to the resistance value of the shunt path in the device. The root cause of the shunt path can be related to bulk issues within the semiconductor layers or to fabrication issues creating shunt paths at the perimeter of the device or somewhere else. Because a well-determined subcell is specifically current-limiting the overall short-circuit current of the three-junction device, and because the apparatus of this disclosure allows to controllably change which subcell is current-limiting, and to sweep the values within ranges of interest, it can be used to clarify the understanding of the performance of multijunction cells, to help troubleshoot any performance limiting issues, and/or to optimize the multijunction cell performance based on the feedback obtained from such comprehensive results. As for series resistance issues, they can typically be detected, if present, at higher forward bias voltages.

Figure 5:
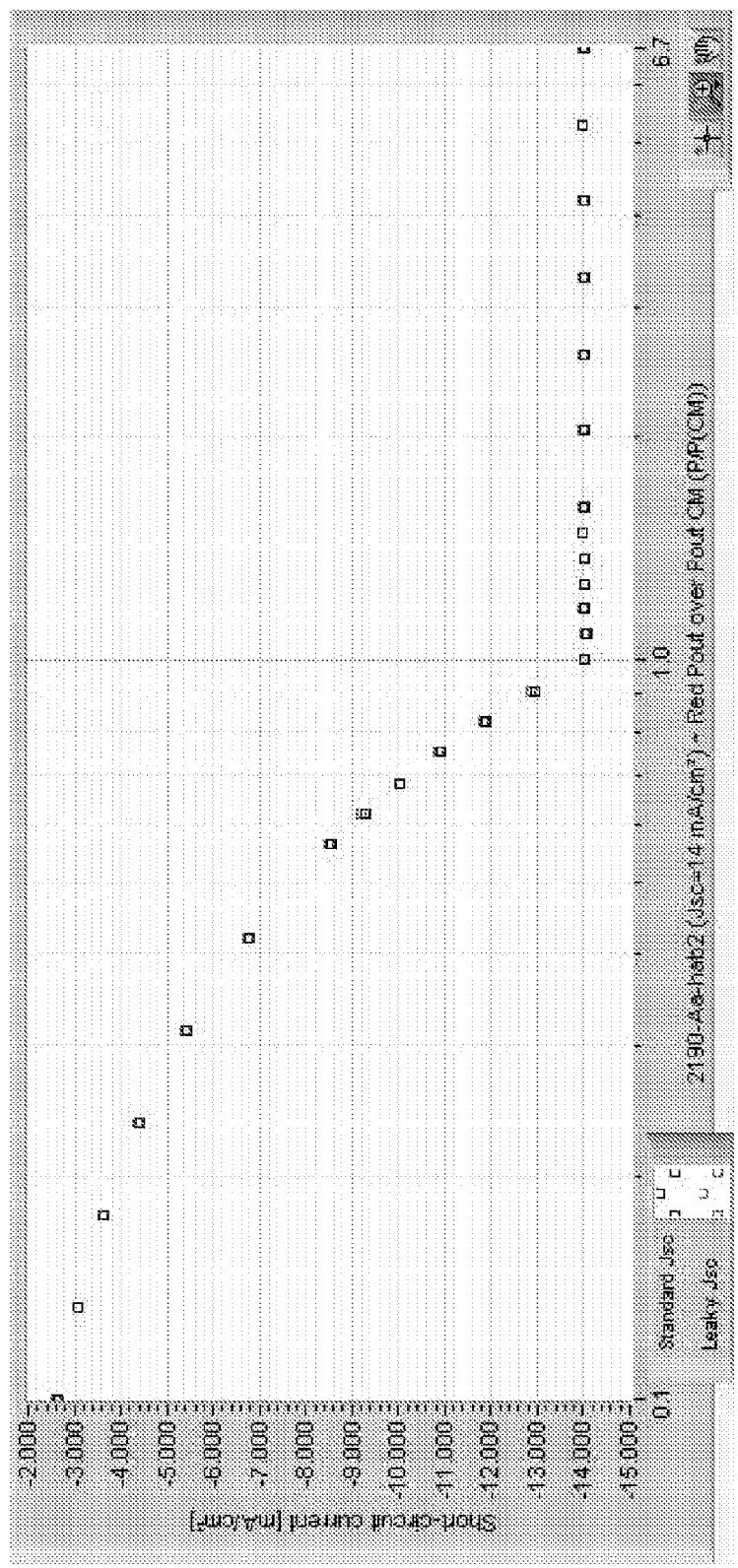
FIG. 5 shows, in accordance with the data shown at FIG. 3, a plot of short circuit current as a function the $P_{MC}/P_{TC}$ ratio.

The data shown at FIG. 3 can also be analyzed by plotting the three-junction solar cell short-circuit current $I_{sc}$ or short-circuit current density ($J_{sc}$) vs the $P_{MC}/P_{TC}$ ratio as shown in FIG. 5, where, as in FIG. 3, $P_{TC}$ is fixed and $P_{MC}$ is varied. As mentioned above in the description of FIG. 3, two distinct regions are distinguishable when sweeping the MC source intensity on either side of the current-matched point when $P_{MC}/P_{TC}=1$. There is the MC current-limiting region, for $P_{MC}/P_{TC}<1$, which can be used to determine the integrated QE of the MC as mentioned above, and there is the TC current-limiting region for $P_{MC}/P_{TC}>1$, in which case the three-junction current is clamped by the TC. Deviations from the expected behaviour would normally indicate some fabrication or design issues with the device being tested. Consequently, it is clear that the apparatus can be used as a good diagnostic and troubleshooting tool. In FIG. 5, and in figures to follow, two calculations were processed from the I-V curves: the "Standard $J_{sc}$" and the "Leaky $J_{sc}$". In the Standard $J_{sc}$ calculation, the short-circuit current is evaluated at an applied voltage of V=0 volts (this is the typical definition used for $J_{sc}$). In the Leaky $J_{sc}$ calculation, the short-circuit current is instead evaluated at an applied voltage where the I-V curve is substantially flat (horizontal). For the data shown at FIG. 5, the Leaky Jsc was evaluated around V ~ 0.1V but inspection of FIG. 3 reveals that a choice of ~ 0.5V<V< ~ 1.0V to evaluate the Leaky $J_{sc}$ would result in similar values. The latter calculation allows to eliminate erroneously deduced short-circuit values which can sometimes arise in multijunction cells when, for example, at least one of the subcells is partially shunted, in which case the current tends to increase with reverse bias around V=0 volts or in reverse bias for V<0 volts. Such shunting issues will typically give an artificially high current at V=0 volts due to these additional shunting paths which, for example, can prevent an otherwise current-limiting subcell to block the overall 3J current. For further clarity, the determination of $J_{sc}$ from J(V=0 volts) can sometimes lead to erroneously high values of $J_{sc}$ when the I-V curves are not substantially horizontal in that region, therefore another methodology which attempts to extracts $J_{sc}$ from a substantially flat part of the I-V curve can be used as a complementary or alternative method. It can be seen that when no substantial shunting is observed that the subcells behave mostly like ideal photodiodes, as is the case in the example of FIG. 3, both methodologies yields substantially the same results as seen in FIG. 5.

The analysis of FIG. 3 also allows to unambiguously determine, with much greater certainty than with the prior art method used for QE measurements, the illumination conditions necessary to achieve the current-matched condition when $P_{MC}/P_{TC}=1$. For example, the information derived from FIG. 5 about the current-matched condition, can be used to record the TC source and MC source intensities ($P_{TC}$ and $P_{MC}$) necessary to balance the current of the devices to be tested, and this information can then be used in the other subsequent tests to adjust the TC, MC and BC sources with the desired illumination ratios. When adjusting these illumination ratios the target spectrum, such as for example ASTM G173-03, AM1.5D, AM1.5G, AM0, or any other spectrum of interest, can be taken into account for the desired set of measurements. Calibration of the apparatus can be achieved, for example, by running the apparatus with known calibrated devices, and/or with individual subcells fabricated and characterized specifically for calibration purposes.

Figure 6:
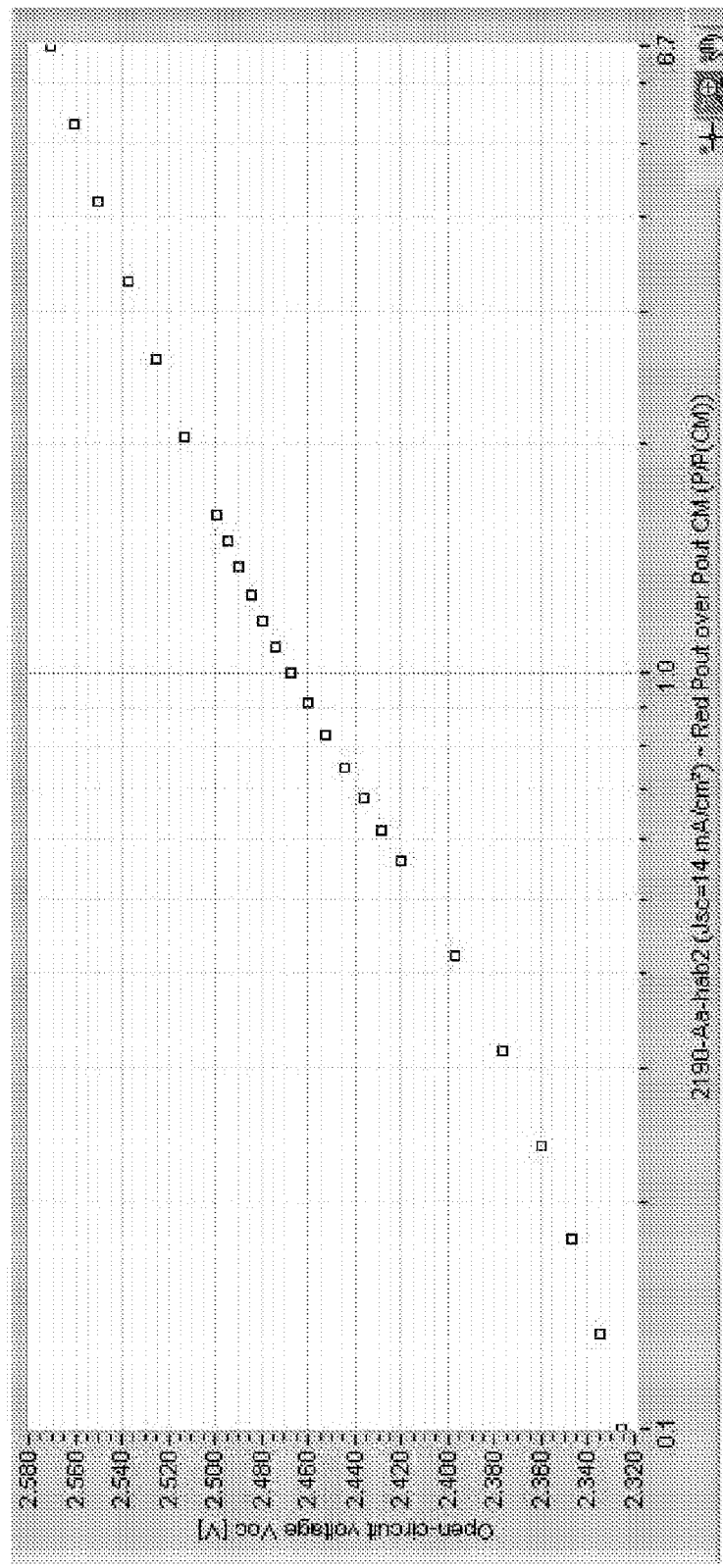
FIG. 6 shows, in accordance with the data shown at FIG. 3, a plot of open circuit voltage as a function of the $P_{MC}/P_{TC}$ ratio.

The data shown at FIG. 3 can also be analyzed by plotting the three-junction solar cell $V_{oc}$ vs the $P_{MC}/P_{TC}$ ratio as shown in FIG. 6. Here again, the TC and MC are current-matched when $P_{MC}/P_{TC}=1$. The ideality factor of the subcell being swept (here the MC) is related to the slope of the plot in FIG. 6. The ideality factor of a p/n junction affects the I-V relationship based on the ideal diode equation, or the Shockley diode equation, $I=I_s*[\exp(qV/nkT)-1]$ (in the dark), or $I=I_L-I_s*[\exp(qV/nkT)-1]$ (illuminated, including photocurrent), where $I_s$ is the reverse saturation current, n is the ideality factor, k is the Boltzmann constant, q is the electron charge, $I_L$ is the photocurrent, T is the temperature, and I is the current obtain at a voltage V. For a multijunction solar cell, the individual n-factors of each subcells add-up in the effective I-V relationship of the multijunction device and it is difficult to extract information about the ideality of individual subcells, but it is a clear advantage of the apparatus of this disclosure to allow to change in a controllable way the illumination of a specific subcell and consequently learn more about the diode characteristics of each subcells. Given the photodiode equation, the n-factor of the subcell in the current-limited mode can be extracted from the slope of the $V_{oc}$ vs $\ln(P_{MC}/P_{TC})$ plot, since $P_{MC}/P_{TC}$ drives the photocurrent in the current-limiting subcell or the excess photocurrent in the current-limited subcell. For example, in FIG. 6, it can be observed that the slope, and therefore the n-factor, is slightly different above vs below the current match point ($P_{MC}=P_{TC}$).

Figure 7:
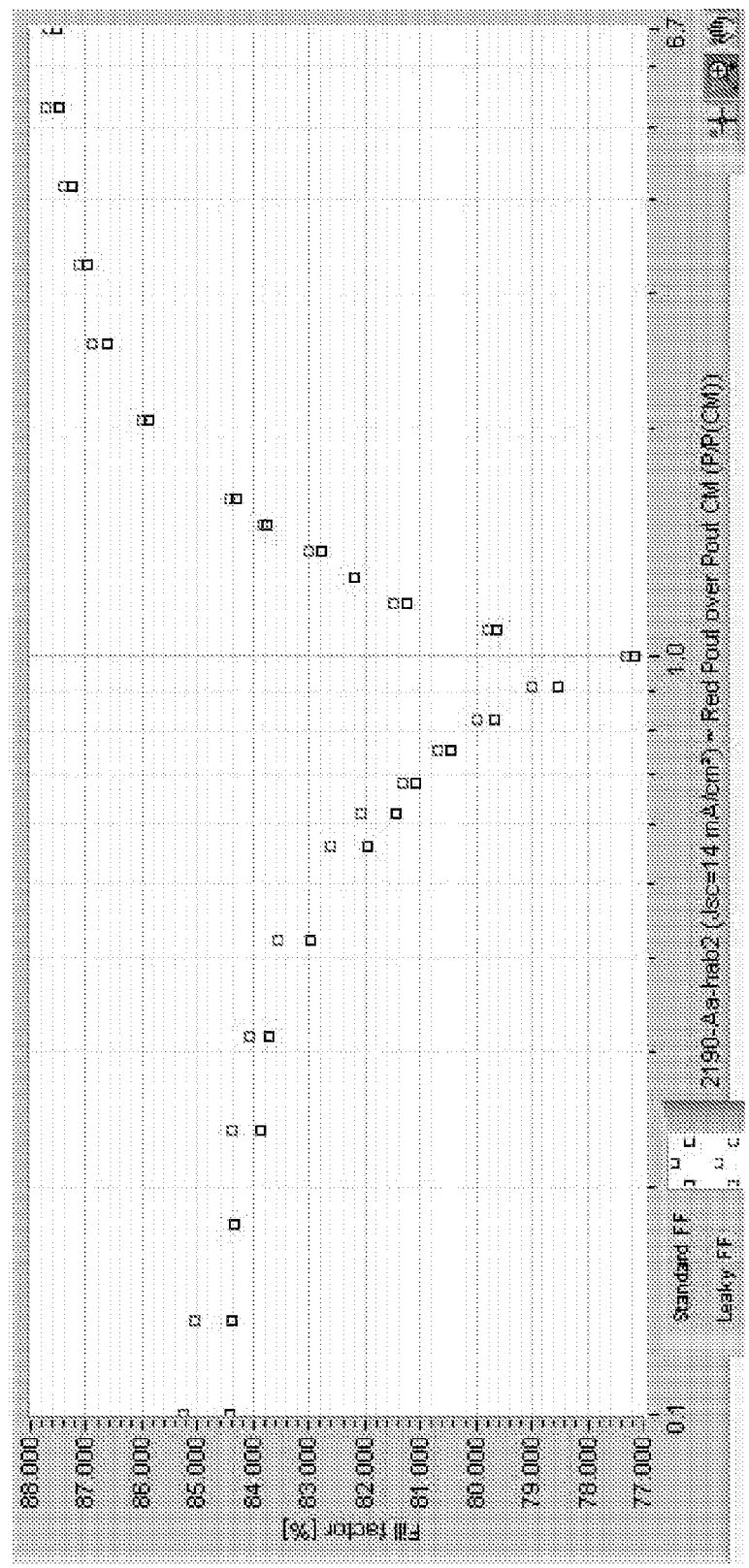
FIG. 7 shows, in accordance with the data shown at FIG. 3, the fill-factor vs the $P_{MC}/P_{TC}$ ratio.

The data set shown in FIG. 3 can be analyzed by plotting the three-junction solar cell fill-factor (FF) vs the $P_{MC}/P_{TC}$ ratio as shown in FIG. 7. Again the TC and MC are current matched when $P_{MC}/P_{TC}=1$. The FF value is minimum when the subcell are closest to being current matched as is clearly seen in FIG. 7. The FF behavior for values when $P_{MC}/P_{TC}<1$ gives information when the multijunction behavior is dominated by MC-limited conditions, and can therefore be used to assess mainly the properties and quality of the MC subcell. The FF behavior for values when $P_{MC}/P_{TC}>1$ gives information when the behavior is dominated by TC-limited conditions, and can therefore be used to assess mainly the properties and quality of the TC subcell. In FIG. 7, given that for $P_{MC}/P_{TC}$ values far away from the current-matched condition the FF reaches high values of ~85% and ~87% for the MC and TC current-limited cases respectively, it can be deduced that both subcells are of high-quality. The slightly lower FF for the MC and the small deviation of the Leaky Jsc calculation may also indicate that further improvements in the quality of the MC can be obtained by perfecting the epitaxy of the MC materials or the cell fabrication processes.

Figure 8:
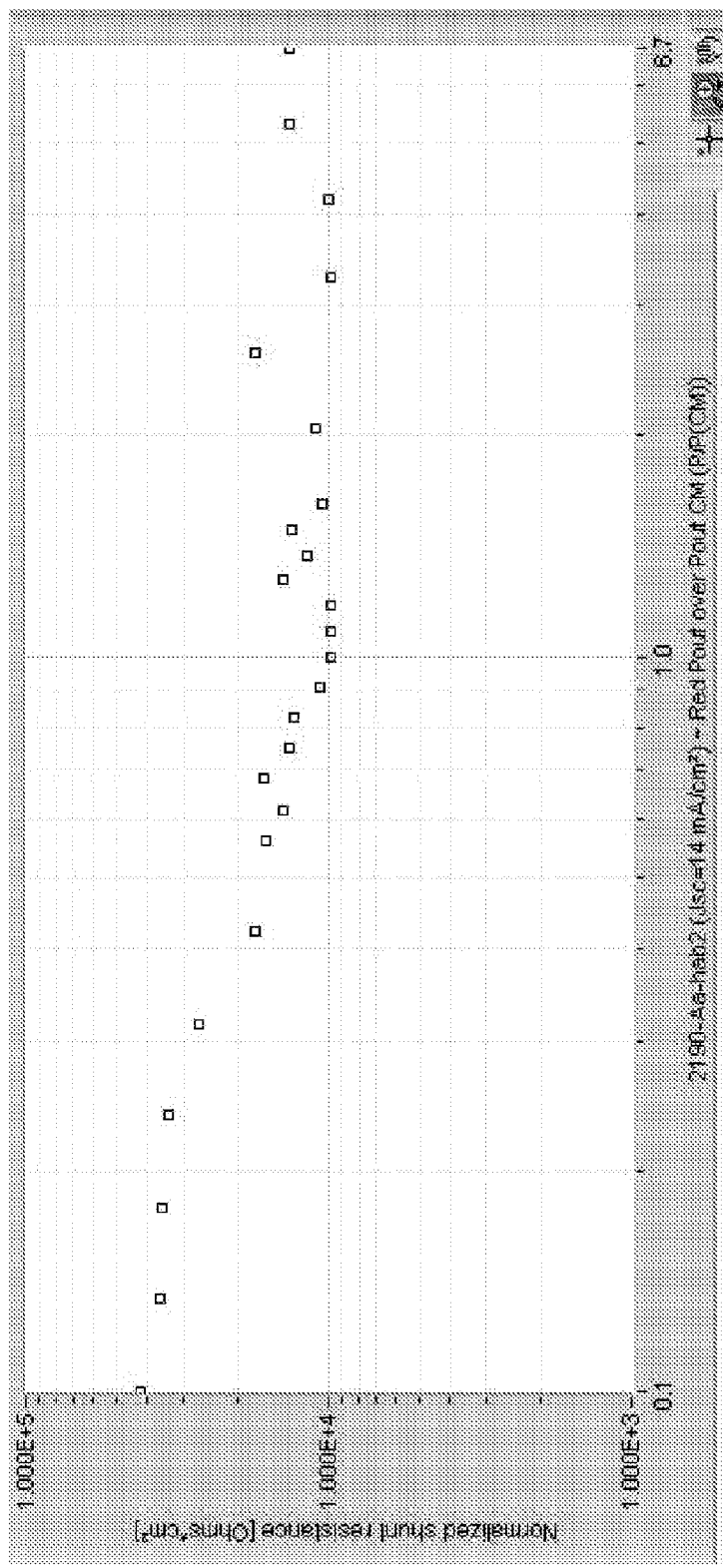
FIG. 8 shows, in accordance with the data shown at FIG. 3, a plot of shunt resistance vs the $P_{MC}/P_{TC}$ ratio.

The data set shown in FIG. 3 can be analyzed by plotting the three-junction solar cell $R_{diff}$ vs $P_{MC}/P_{TC}$ ratio as shown in FIG. 8. The information can be used to better quantify the shunt properties of the dominant subcell being current limited as explained for the case of the FF analysis in FIG. 8. For example, both TC and MC have an internal impedance exceeding 10 kohms*cm$^2$ in FIG. 8.

After sweeping the MC illumination, the exemplary apparatus of FIG. 1 can be controlled to repeat a similar sequence for example to keep the TC and MC at constant illuminations and sweep the light intensity provided to the BC. As mentioned above, the current-matched condition found in the MC-sweep shown at FIGS. 3 to 8, and in particular in FIGS. 5 and 7, can be used to accurately set the desired source illumination ratios. For example, in FIGS. 9 to 14, the MC/TC ratio is set to 1.1, with the TC short-circuit current still set at a fixed value of −14 mA/cm$^2$. In a BC sweep performed under these conditions, the three-junction device will therefore evolve from being BC current-limited to TC current-limited as the intensity of the BC source is progressively increased. Therefore, with this set of parameters for the sources, it can be ensured with great certainty that the three-junction solar cell will never be in a MC current-limited condition but will instead be set with the desired MC illumination ratio for the BC source sweep shown in FIGS. 9 to 14.

Figure 9:
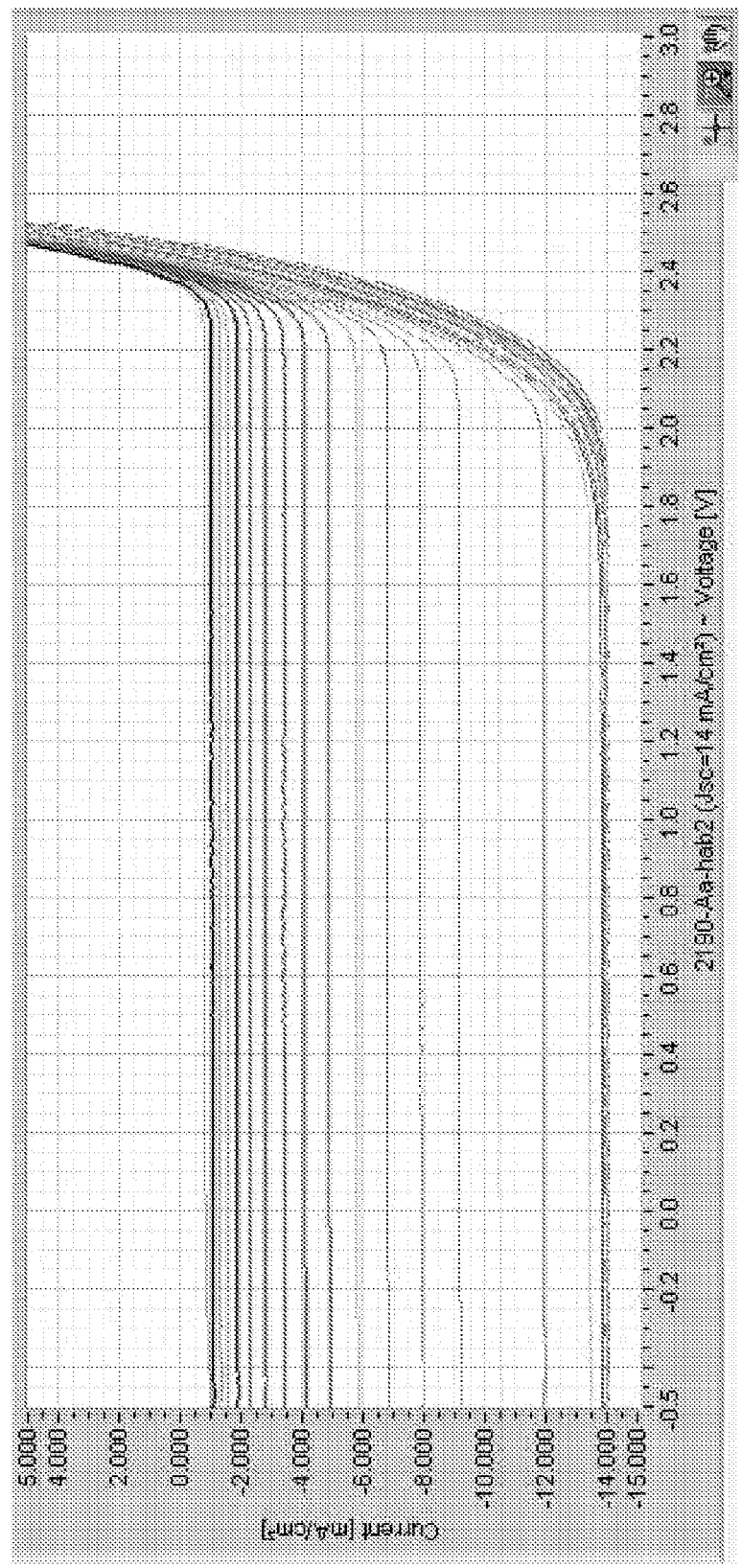
FIG. 9 shows multiple I-V plots at different illumination conditions, for second characterization parameters, for the same three-junction solar cell that is characterized at FIG. 2.
Figure 10:
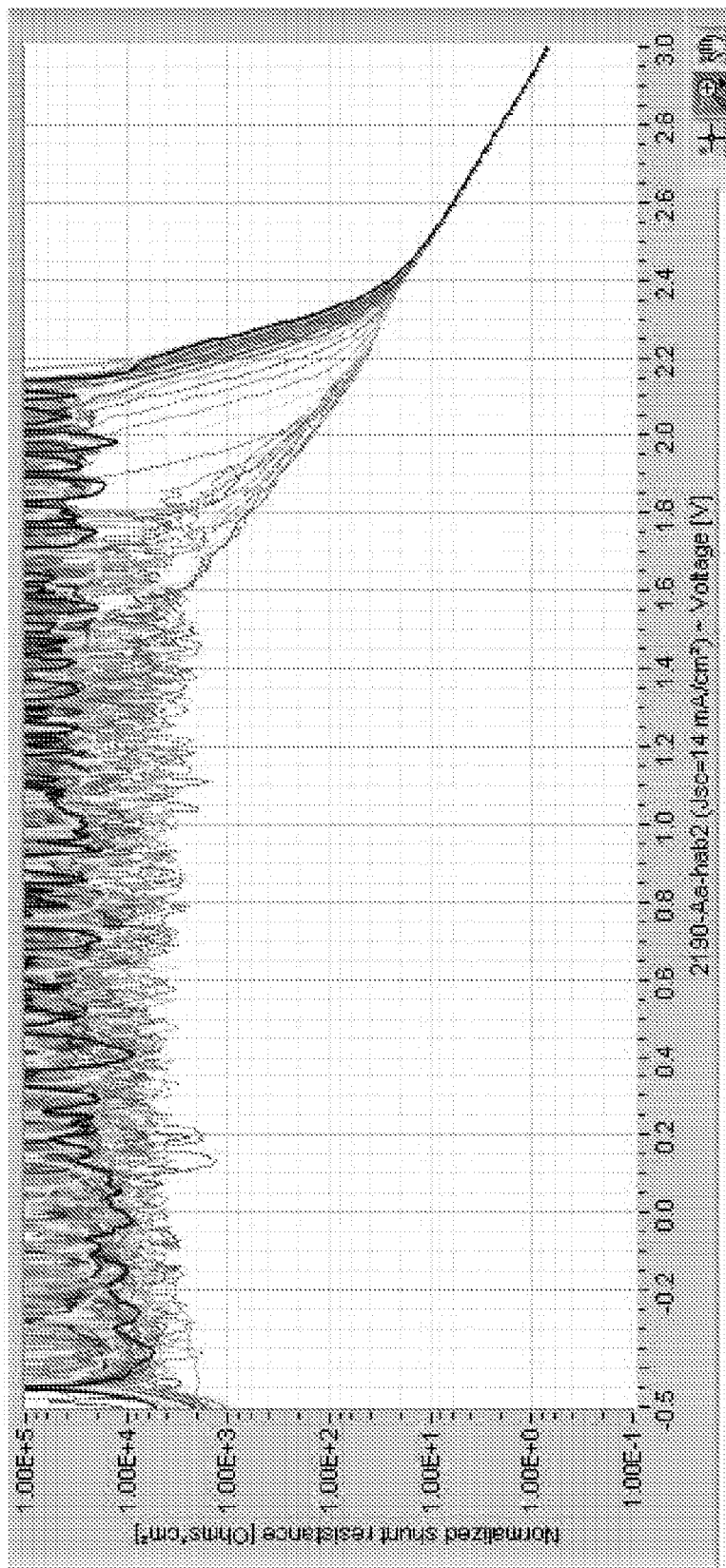
FIG. 10 shows, in accordance with the data shown at FIG. 9, plots of resistance as a function of voltage.

FIG. 9 shows multiple I-V plots obtained by sweeping the light intensity of the BC light source which, in this case, is a QTH source. The electrical power applied to the QTH source is used as a means to adjust the power of the BC source. The change in the applied power to the QTH source will also change slightly its spectral distribution, but the source is also filtered spectrally using long-pass filters to only let wavelengths >~1.0 mm reach the multijunction device. The other setup conditions for FIG. 9 and its associated FIGS. 10 to 14 are: a green laser with an emission wavelength of about 532 nm is set as the TC source to obtain a TC subcell photocurrent of −14.0 mA/cm². As previously mentioned, the MC source is also fixed at an intensity to give a MC photocurrent of 1.1×−14 mA/cm² (i.e., $P_{MC}=1.1 \times P_{TC}$). A controllable intensity laser diode emitting at around 805 nm is used for the MC source. The range of intensities available for the sweep shown in FIG. 9 are from $P_{BC} \sim 1/12 \, P_{MC}$ to $\sim 4 \, P_{MC}$. FIG. 10 shows the differential resistance ($R_{diff}$) vs V obtained from the data of FIG. 9, and the interpretation of the results are similar to what was explained above in relation to FIG. 4. The difference is that in the case of FIG. 10, the BC is current-limiting at low illumination intensities instead of the MC being current-limiting as was the case for FIG. 4 for the MC illumination-intensity sweep. Therefore, shunting issues related to the BC subcell are expected to be revealed, if any are present, for datasets such as the one shown in FIG. 10.

Figure 11:
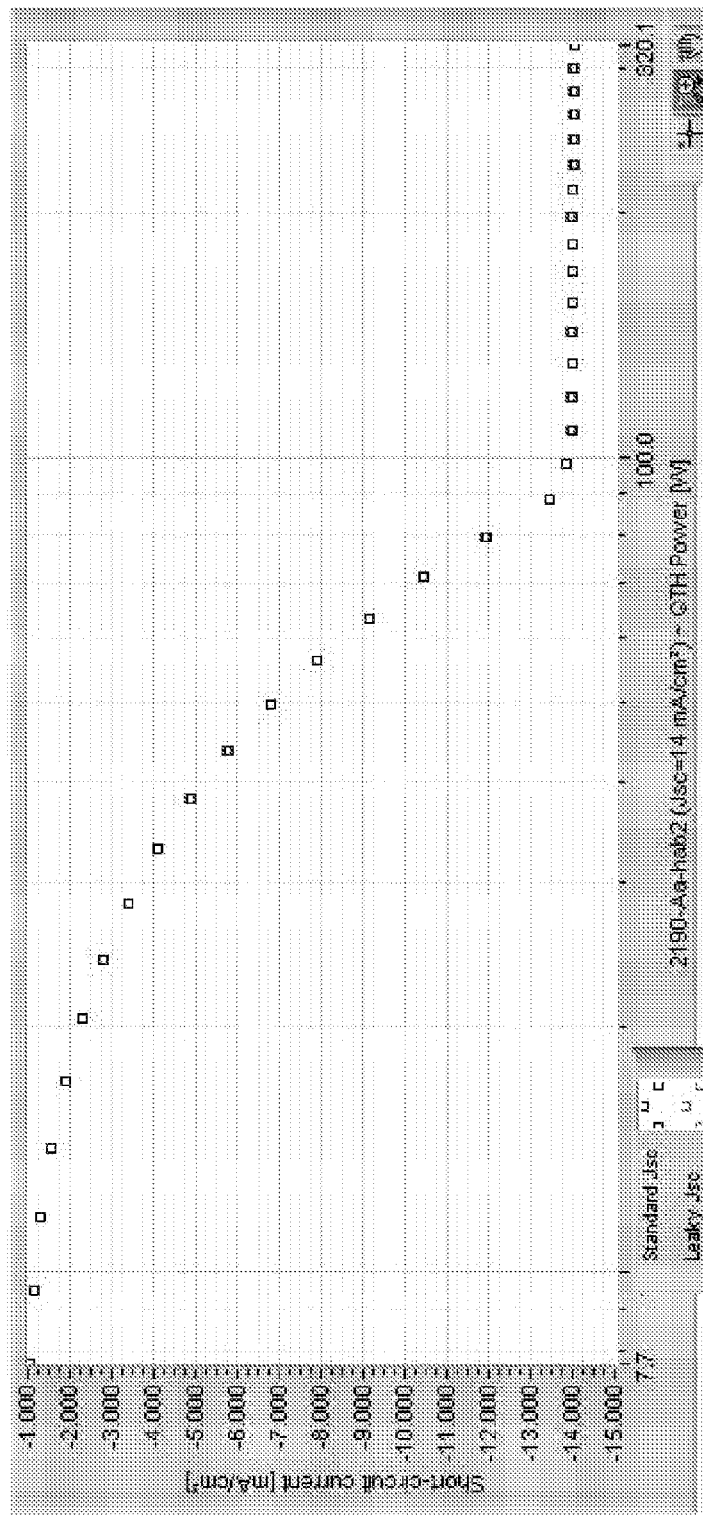
FIG. 11 shows, in accordance with the data shown at FIG. 9, a plot of short circuit current as a function the $P_{BC}$ ratio.
Figure 12:
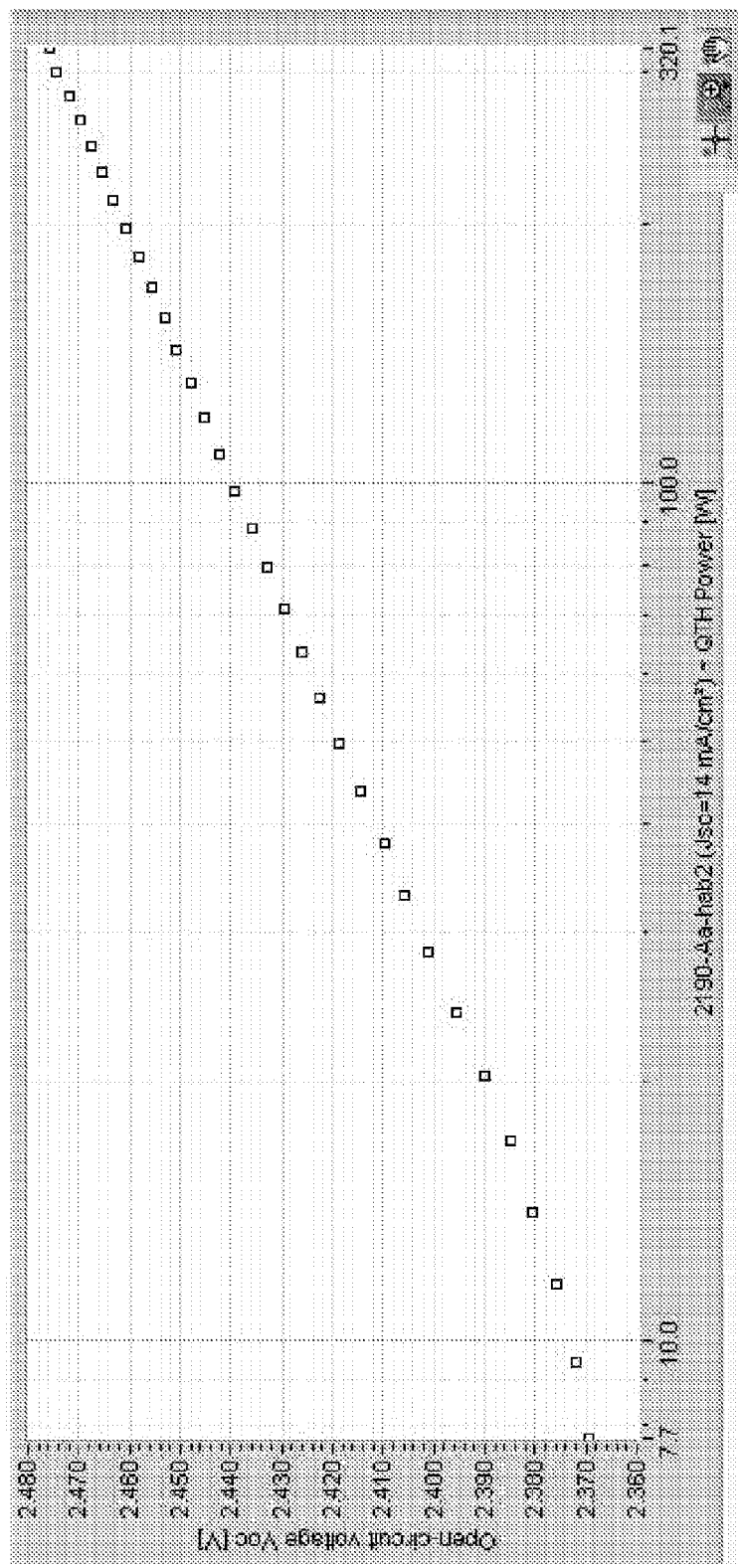
FIG. 12 shows, in accordance with the data shown at FIG. 9, a plot of open circuit voltage as a function of the $P_{BC}$ ratio.
Figure 13:
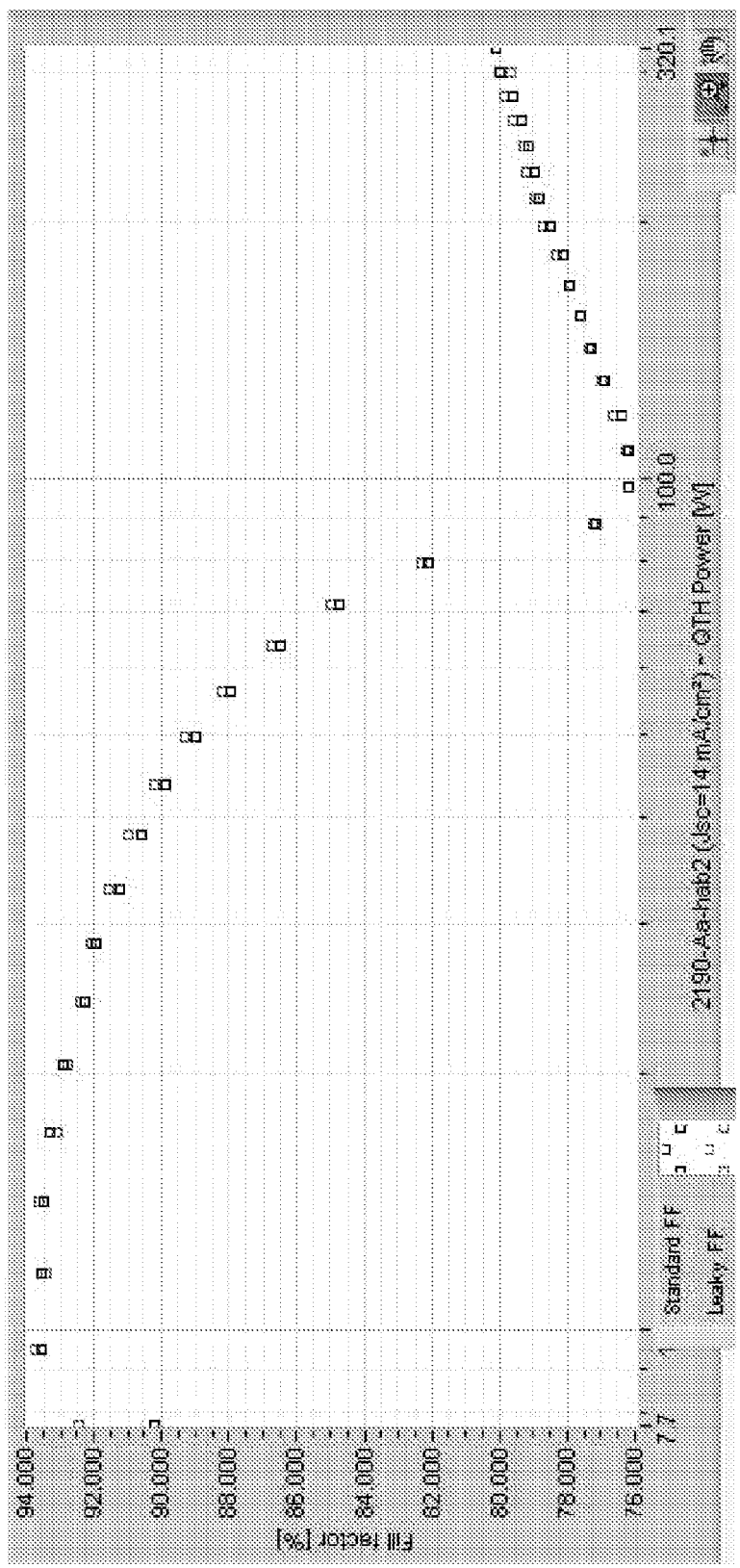
FIG. 13 shows, in accordance with the data shown at FIG. 9, the fill-factor vs the $P_{BC}$ ratio.
Figure 14:
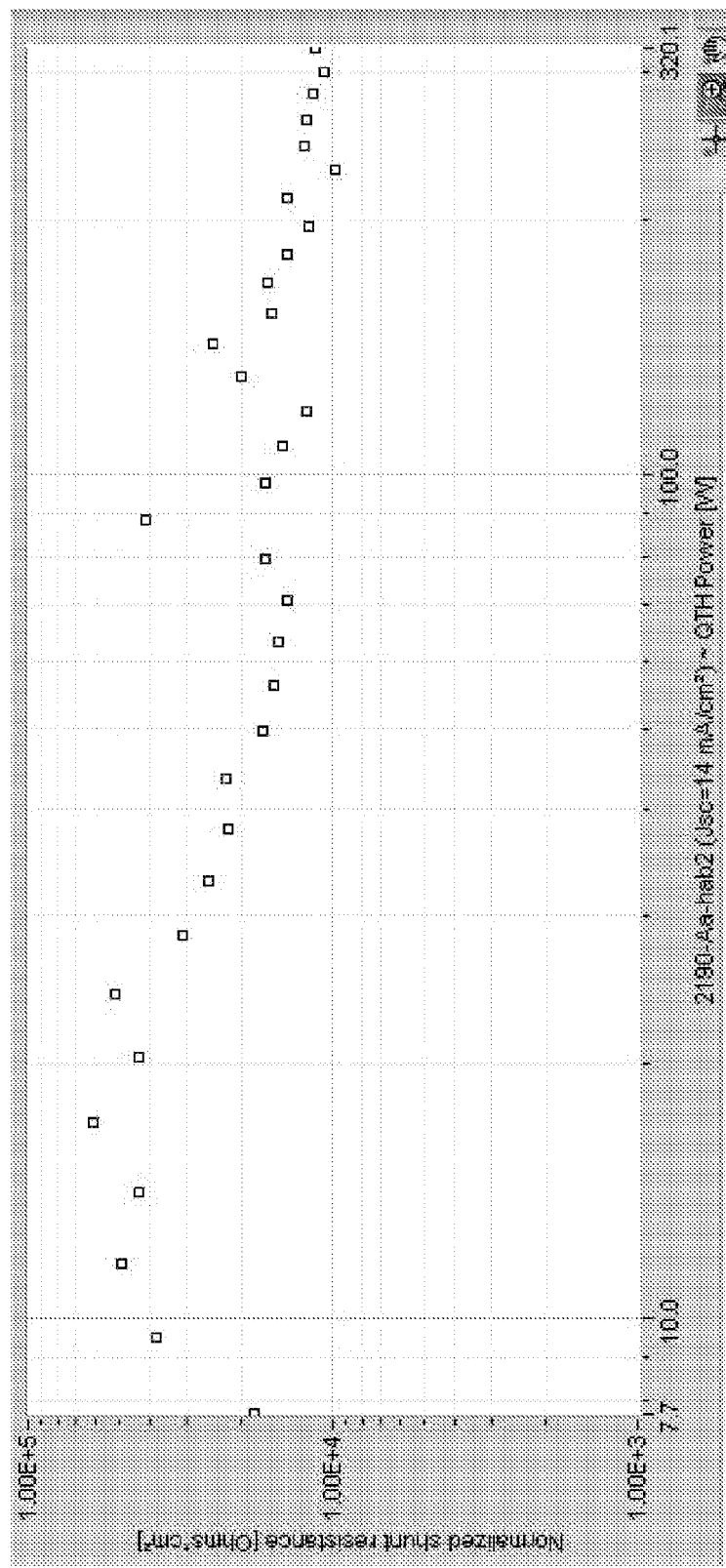
FIG. 14 shows, in accordance with the data shown at FIG. 9, a plot of shunt resistance vs the $P_{BC}$ ratio.

Also derived from the data of FIG. 9 is FIG. 11, the three-junction solar cell short-circuit current $I_{sc}$ or short-circuit current density ($J_{sc}$) vs "QTH power" or equivalently Jsc vs $P_{BC}$, since "QTH power" here is the electrical power applied to the BC source, so nominally $P_{BC}$. The x-axis of FIG. 11 has not been re-normalized to display $P_{BC}/P_{TC}$ (where $P_{BC}$ is swept and $P_{TC}$ is fixed) as was the case for the equivalent FIG. 5 in the case of the MC sweep. In either case, the equivalent information can be derived and both methods are valid once properly calibrated. It is also clear that the data of FIG. 11 allows to unambiguously determine the illumination conditions necessary to achieve the current-matched condition for which, in this case, $P_{BC}=P_{TC}=P_{MC}/1.1$. Similarly, other information derived from the data shown in FIG. 9 are shown in FIG. 12 (the three-junction solar cell $V_{oc}$ vs $P_{BC}$), in FIG. 13 (the three-junction solar cell fill-factor (FF) vs $P_{BC}$), and in FIG. 14 (the three-junction solar cell $R_{diff}$ vs $P_{BC}$). Similar to the case of the MC sweep shown in FIGS. 3 to 8, the BC sweep shown in FIGS. 9 to 14 can be used to derive several other valuable and accurate parametric and performance information about the individual subcells. More information and better control is achieved using this apparatus compared to the prior art apparatus.

For example, depending on the spectral content used for the BC source, the integrated or wavelength specific quantum efficiency of the BC subcell can be derived under better controlled conditions from the data shown in FIG. 9 or FIG. 11 (as explained in corresponding FIGS. 3 and 5 respectively for the MC sweep). The information about the diode ideality factor of the BC can be derived from FIG. 12, and thus quantitative assessment of the $V_{oc}$ dependence with the amount of excess photocurrent generated by the BC can be determined and use to predict the three-junction solar cell performance for insolation corresponding to spectral conditions different from the nominal target spectrum (for example blue-rich or red-rich sun conditions depending on the time of the day). Similarly, a quantitative assessment of the FF dependence with the amount of excess photocurrent generated by the BC can be obtained from FIG. 13 in addition to the FF values expected under current-matched conditions or away from it. More information specific to the BC internal impedance or any related shunting issues particular to the BC can be obtained from FIG. 14, in particular for the BC source range of power corresponding to the BC current-limiting conditions.

It will be understood to one of ordinary skilled in the art that other useful parameters, combination of parameters, data, or plots can be generated or derived from the apparatus of the present disclosure. The above sets of figures were used to exemplify a MC sweep (FIGS. 3 to 8) and a BC sweep (FIGS. 9 to 14) with the TC source set to generate a fixed TC photocurrent of −14 mA/cm². A sequence can also be set with the apparatus for doing a TC sweep to investigate the TC quantum efficiency, the TC internal impedance or any related shunting, the TC diode ideality factor, the current-matching conditions, the $V_{oc}$ and FF dependence with the excess photocurrent in the TC or with unbalanced spectral conditions, or any other parameters, or fundamental or derived diode characteristics as described in the sweeps of the previous figures or which can be derived from similar measurements, plots, or analysis.

For example, in the next figures, the TC source was set to generate a TC photocurrent of −7 mA/cm² instead of −14 mA/cm², and the MC sweep and the BC sweep described above in FIGS. 3 to 8, and FIGS. 9 to 14 respectively were repeated. Accordingly, FIGS. 15 to 20 relate to a different intensity sweep of the MC than what is shown at FIGS. 3 to 8. The setup conditions for FIG. 15 and its associated FIGS. 16 to 20 are: a green laser was used for the TC source and set to generate a TC photocurrent of −7.0 mA/cm², a spectrally filtered QTH source was used as the BC source and set to an electrical power of 16.0 A, to obtain $P_{BC} \sim 1.4 \times P_{TC}$. Here again, an intensity-controllable laser emitting at about 805 nm is used for the MC source. By re-measuring the device with a different intensity condition for the TC current, it allows to extract some information on the evolution of the electro-optical performance as a function of the photocurrent generated in the TC. This can be done as an alternative, or in addition, to sweeping the intensity of the TC while keeping MC and the BC at a constant illumination. The results for a TC sweep are not shown here, but typical give results qualitatively similar to the ones shown at FIGS. 3 to 8 or at FIGS. 15 to 20. The difference for the TC sweep is that more information ca be derived predominantly with respect to the TC parameters such as the ideality factor of that subcell, or any shunting or series resistance issues, etc, as was done in the case of the MC sweep of FIGS. 3 to 8 or at FIGS. 15 to 20.

Figure 15:
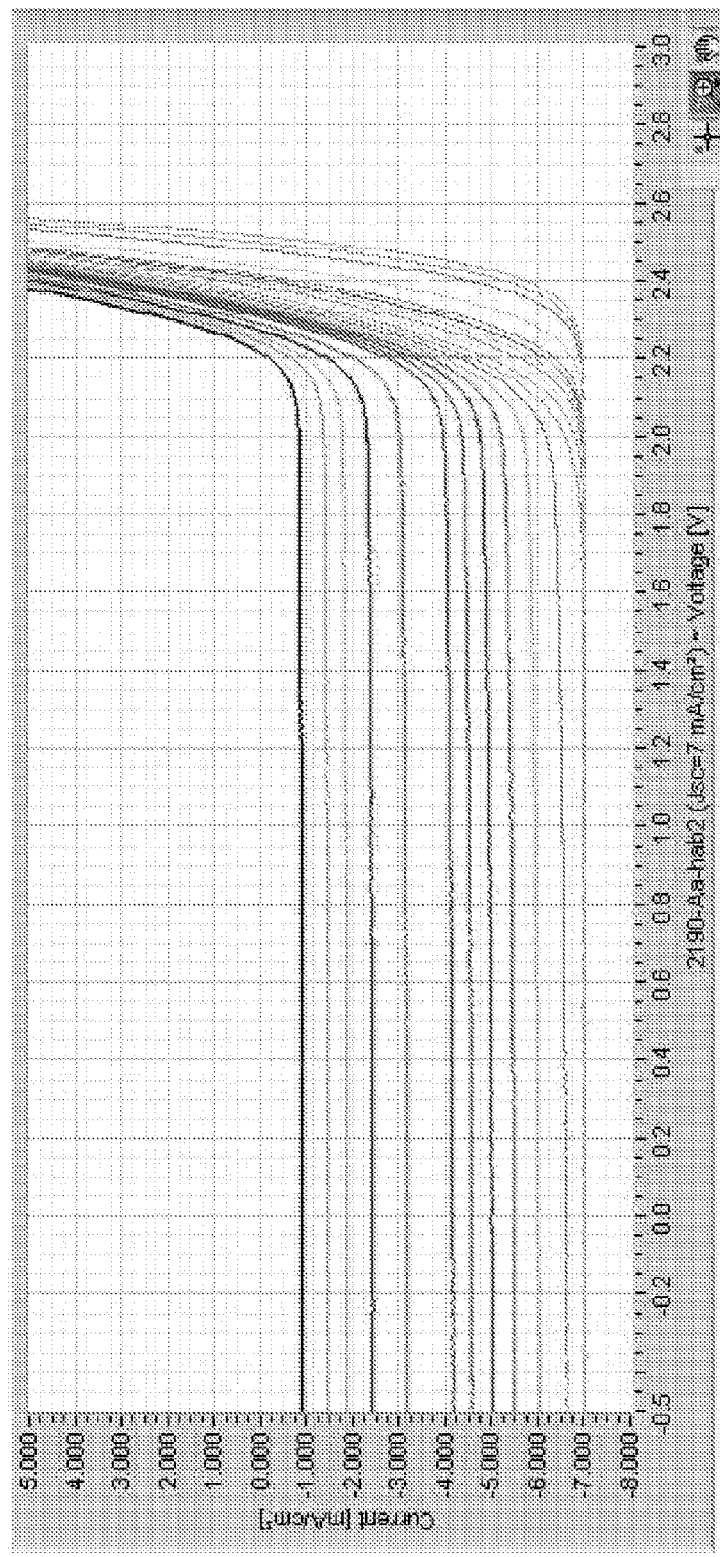
FIG. 15 shows multiple I-V plots at different illumination conditions, for third characterization parameters, for the same three-junction solar cell that is characterized at FIG. 2.
Figure 16:
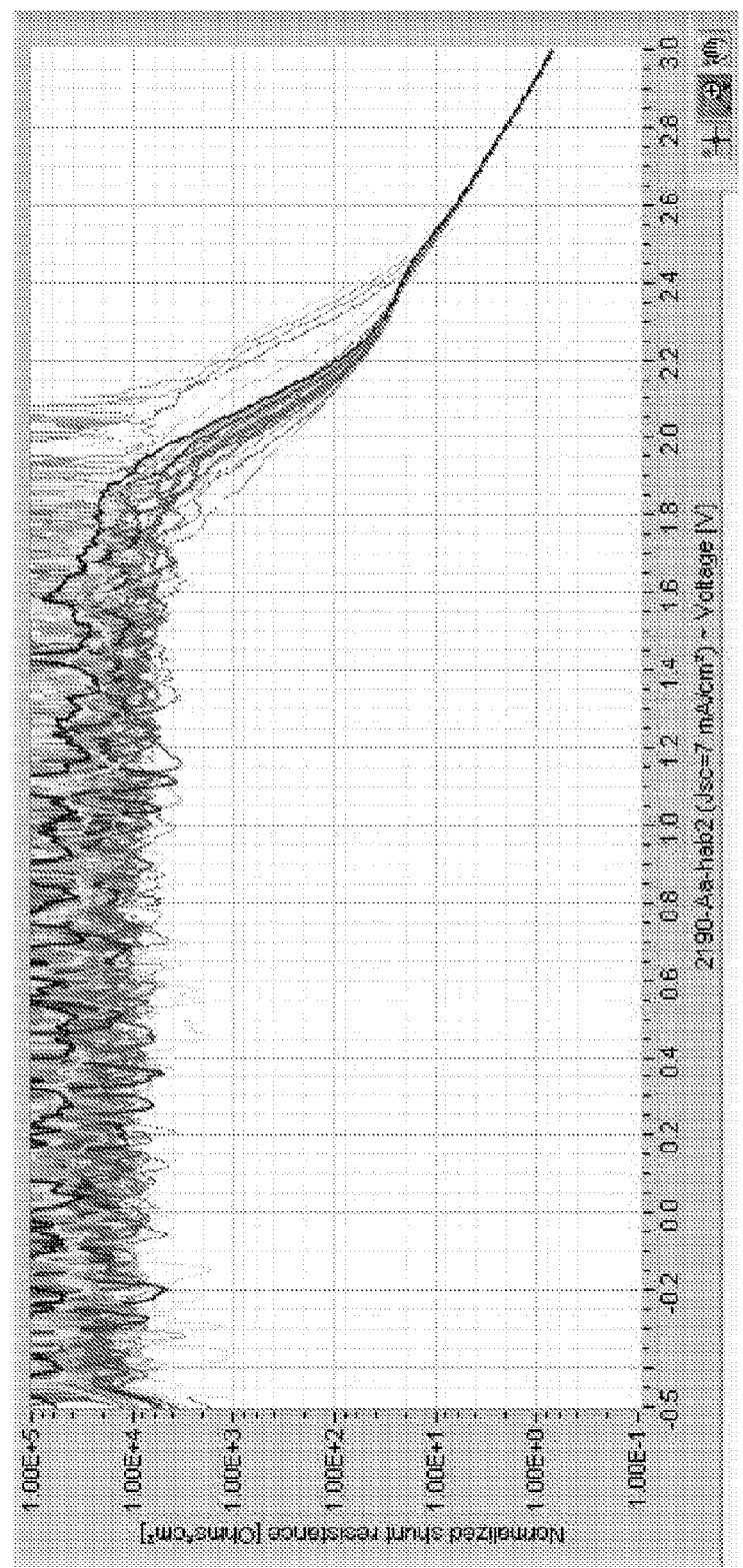
FIG. 16 shows, in accordance with the data shown at FIG. 15, plots of resistance as a function of voltage.
Figure 17:
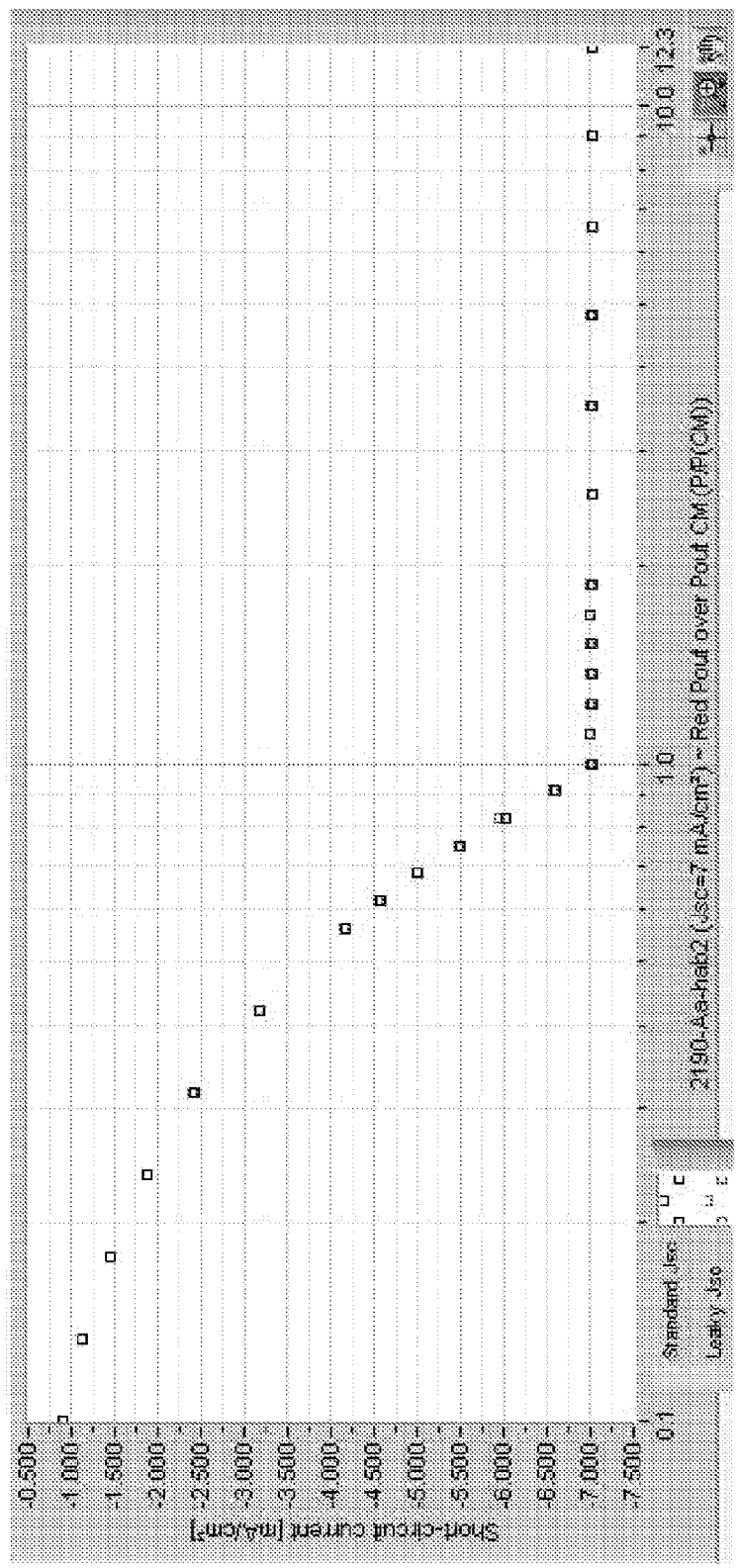
FIG. 17 shows, in accordance with the data shown at FIG. 15, a plot of short circuit current as a function the $P_{MC}/P_{TC}$ ratio.
Figure 18:
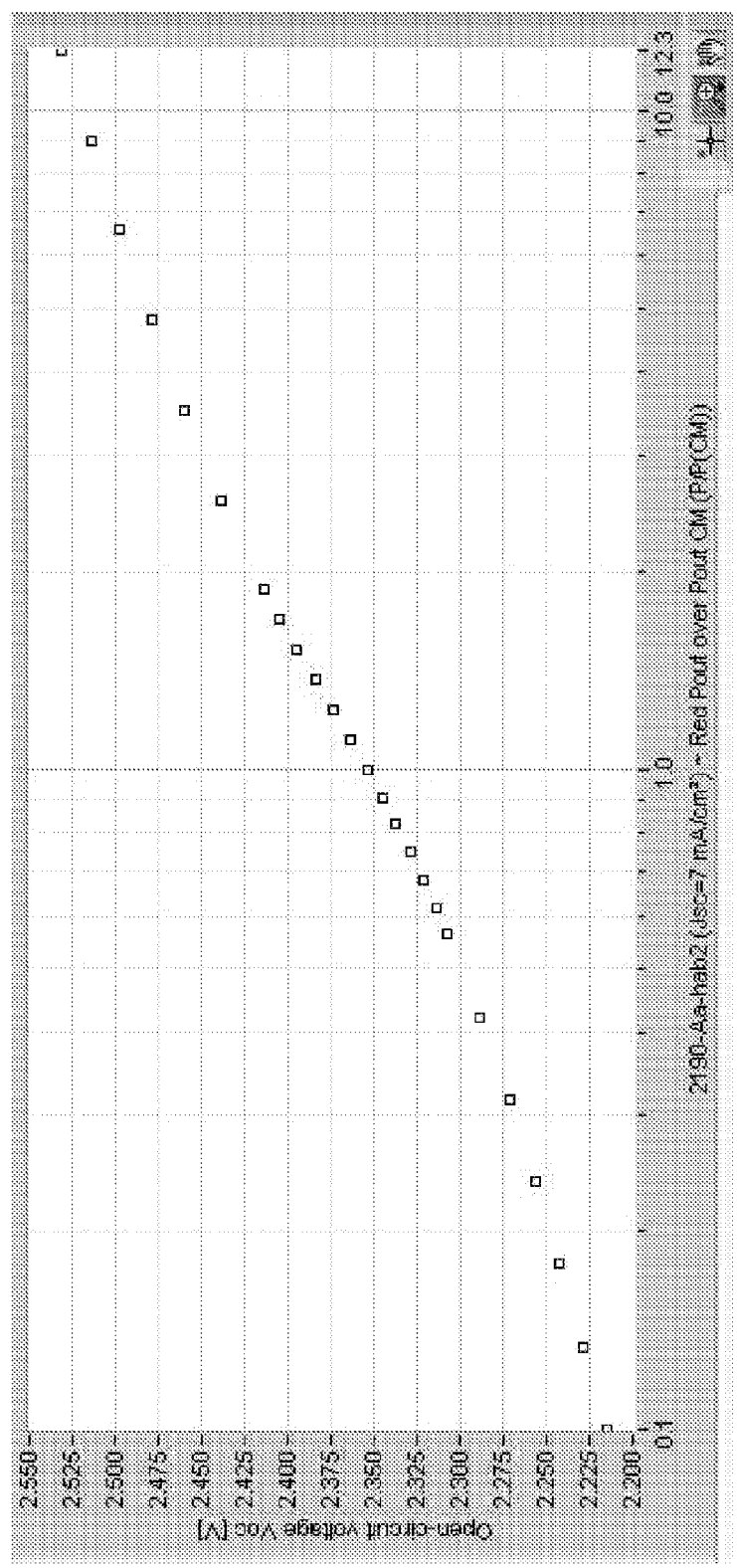
FIG. 18 shows, in accordance with the data shown at FIG. 15, a plot of open circuit voltage as a function of the $P_{MC}/P_{TC}$ ratio.
Figure 19:
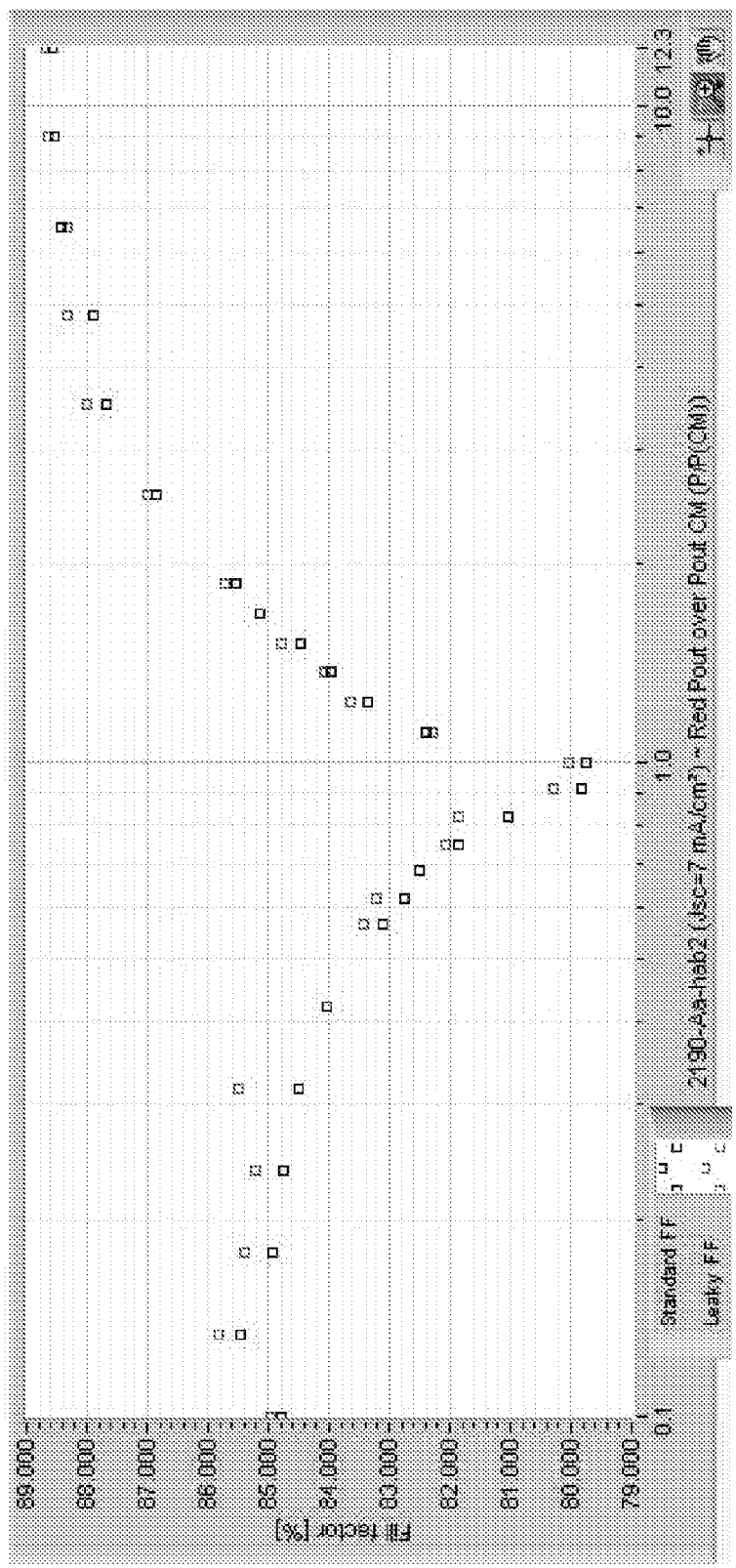
FIG. 19 shows, in accordance with the data shown at FIG. 15, the fill-factor vs the $P_{MC}/P_{TC}$ ratio.
Figure 20:
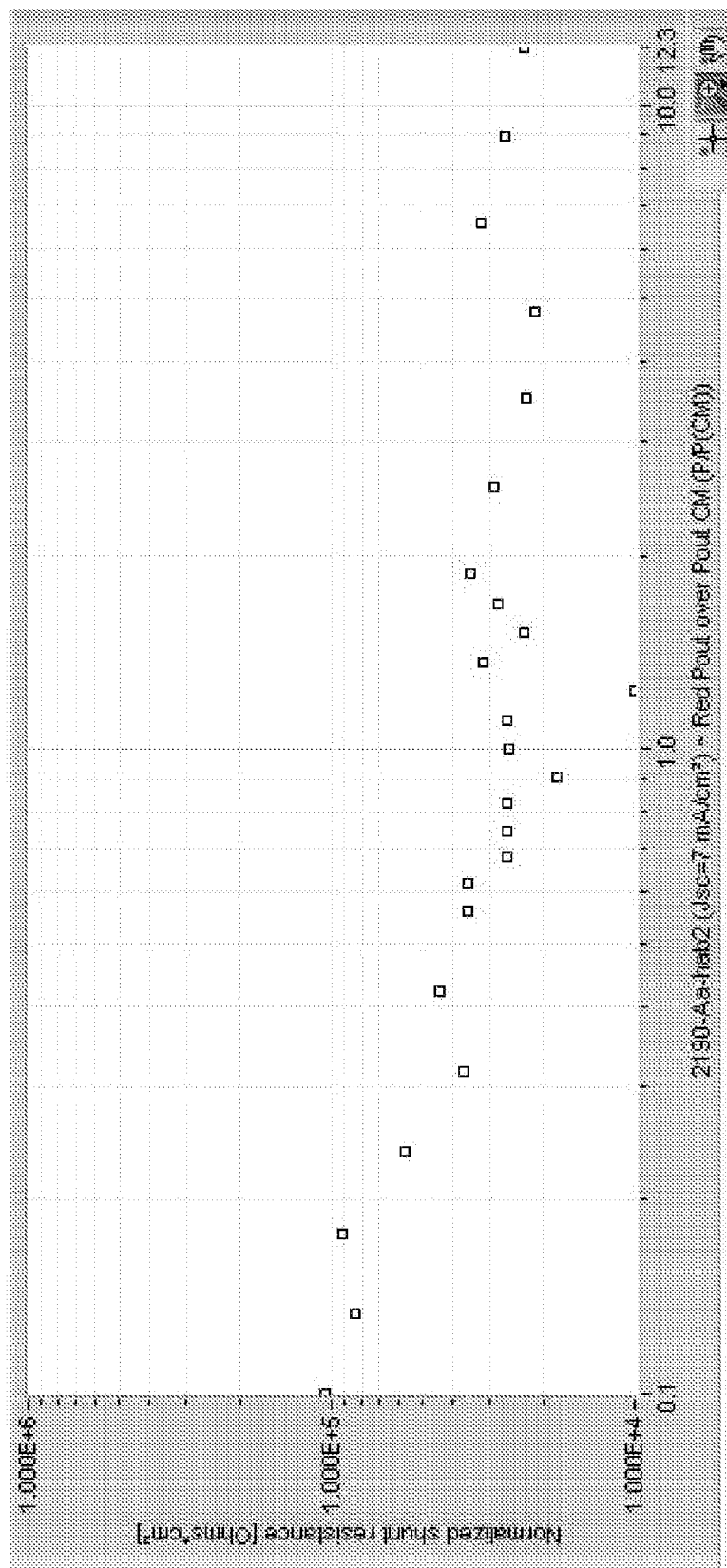
FIG. 20 shows, in accordance with the data shown at FIG. 15, a plot of shunt resistance vs the $P_{MC}/P_{TC}$ ratio.

Similar to FIG. 3, FIG. 15 shows multiple I-V plots obtained by sweeping the light intensity of the MC light source which is the previously mentioned laser light source that emits at about 805 nm The power of the MC source is varied while the spot size is fixed to make sure the device is illuminated uniformly with an intensity varied between about one tenth and ten times the intensity necessary to generate a MC photocurrent of −7 mA/cm² for this sweep (since a MC photocurrent of −7 mA/cm² will current-match the fixed TC photocurrent of −7 mA/cm² generated with the TC source). FIG. 16 shows the differential resistance ($R_{diff}$) vs V obtained from the data of FIG. 15. Also obtained from the data of FIG. 15 is FIG. 17 (the three-junction solar cell short-circuit current $I_{sc}$ or short-circuit current density ($J_{sc}$) vs the $P_{MC}/P_{TC}$ ratio), FIG. 18 (the three-junction solar cell $V_{oc}$ vs the $P_{MC}/P_{TC}$ ratio), FIG. 19 (the three-junction solar cell fill-factor (FF) vs the $P_{MC}/P_{TC}$ ratio), and FIG. 20 (the three-junction solar cell $R_{diff}$ vs $P_{MC}/P_{TC}$ ratio). The detailed interpretation of FIGS. 15 to 20 for the MC sweep for a TC photocurrent set at −7 mA/cm² is analogous to the description given above for FIGS. 3 to 8 for the MC sweep for a TC photocurrent set at −14 mA/cm². The main difference is that clearly, the three-junction photocurrent is clamped at −7 mA/cm² as can be seen in FIGS. 15 and 17.

Figure 21:
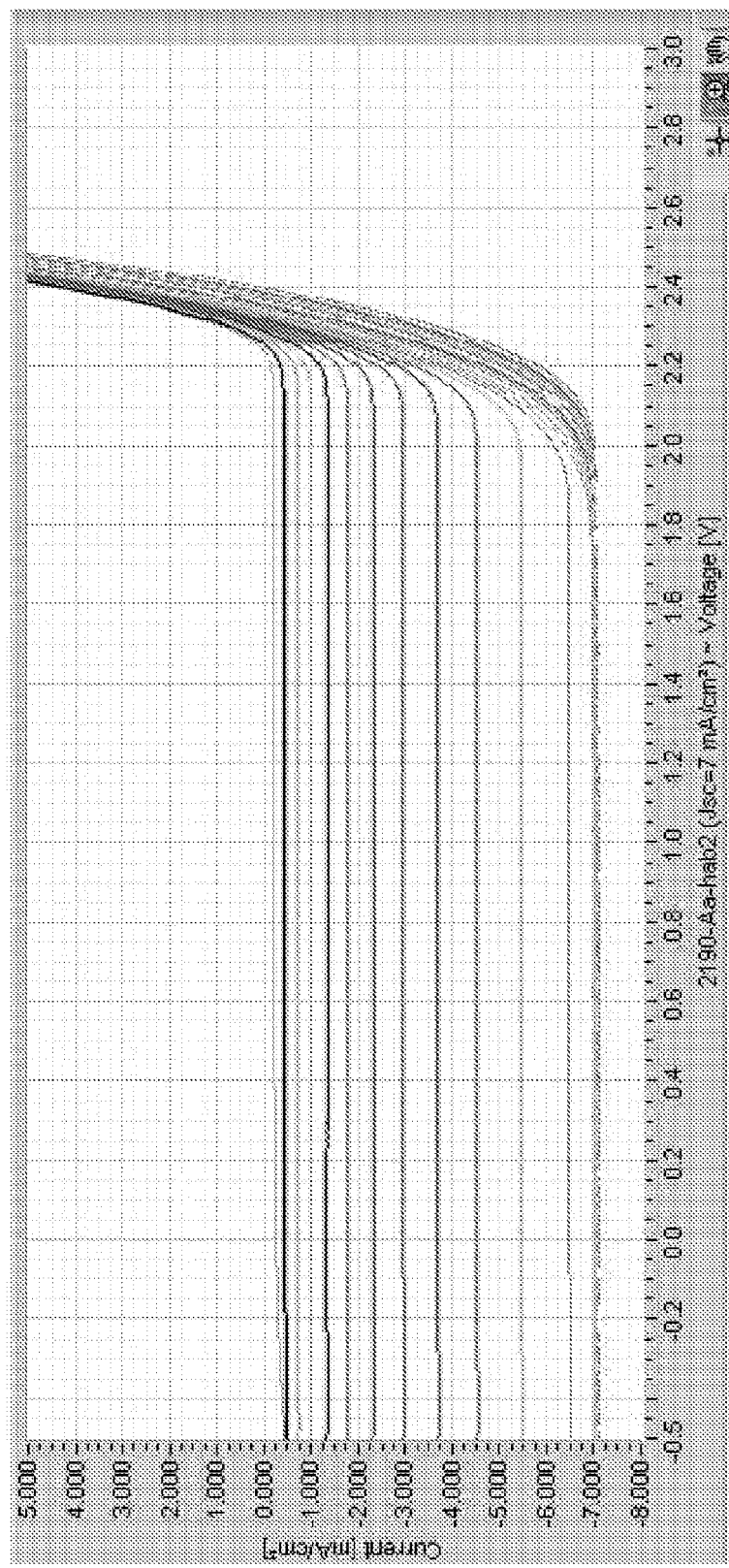
FIG. 21 shows multiple I-V plots at different illumination conditions, for fourth characterization parameters, for the same three-junction solar cell that is characterized at FIG. 2.

FIG. 21 shows multiple I-V plots obtained by sweeping the light intensity of the BC light source (46B of FIG. 1) which is a filtered QTH source. The QTH source is filtered using a thin GaAs slab, thinner than 1 mm in this example, which is polished on both sides and which is only transmitting the spectral range for wavelengths greater than ~900 nm corresponding to the BC spectral response range. It should be noted that any other appropriate filter arrangements can be used). The setup conditions for FIG. 21 and its associated FIGS. 22 to 26 are: a green laser was used for the TC source, 48T of FIG. 1, and $P_{TC}$ was set to generate a TC photocurrent of −7.0 mA/cm², A MC source (48M of FIG. 1) was set at $P_{MC}=1.1\times P_{TC}$ and therefore ensuring, in a controllable way, that the three-junction I-V curves obtained controllably in the BC sweep are never obtained in a MC current-limited condition, as was explained in the BC sweep described above in the context of FIGS. 9 to 14. Therefore, FIG. 21 is similar to FIG. 9, but is obtained for a TC photocurrent of −7 mA/cm².

Figure 22:
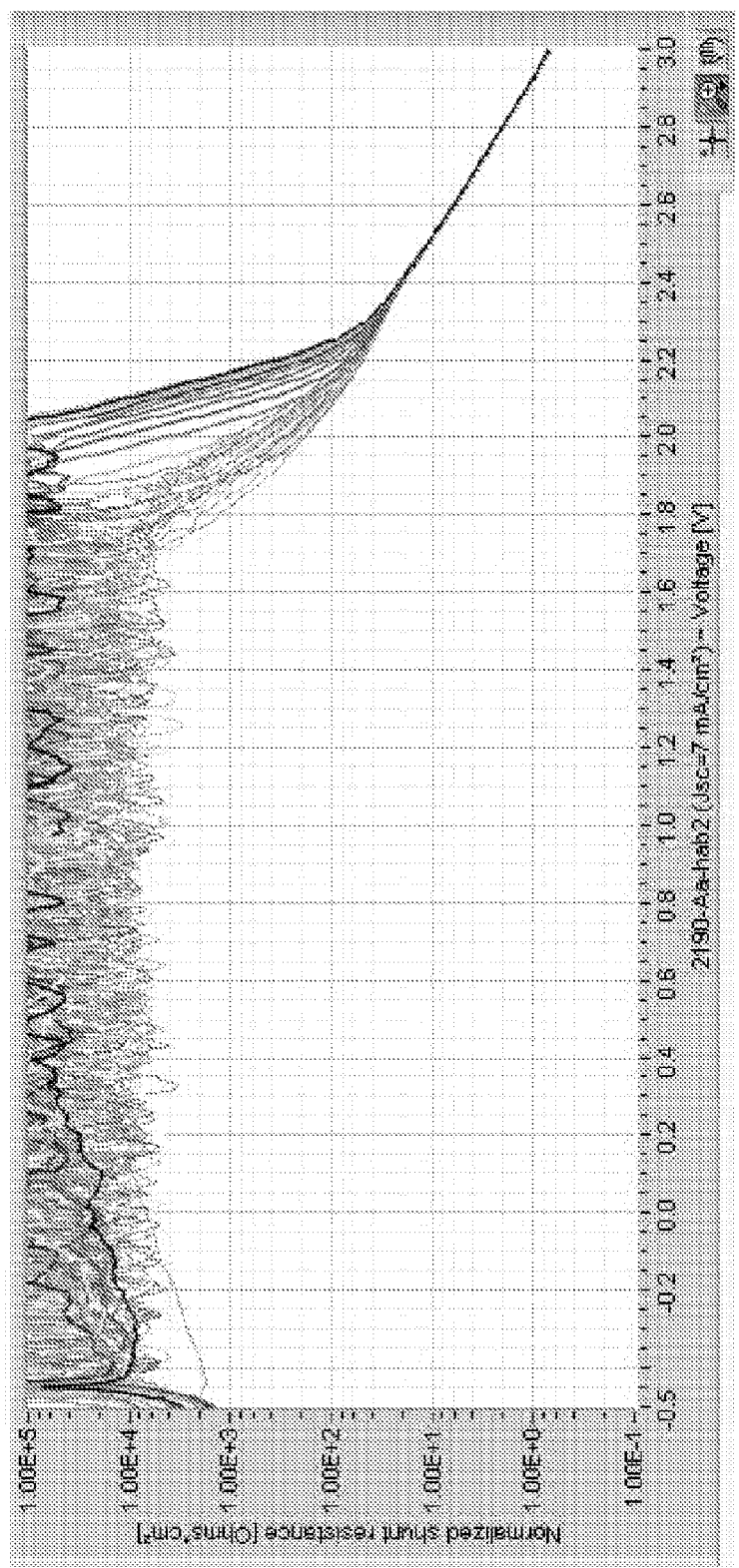
FIG. 22 shows, in accordance with the data shown at FIG. 21, plots of resistance as a function of voltage.
Figure 23:
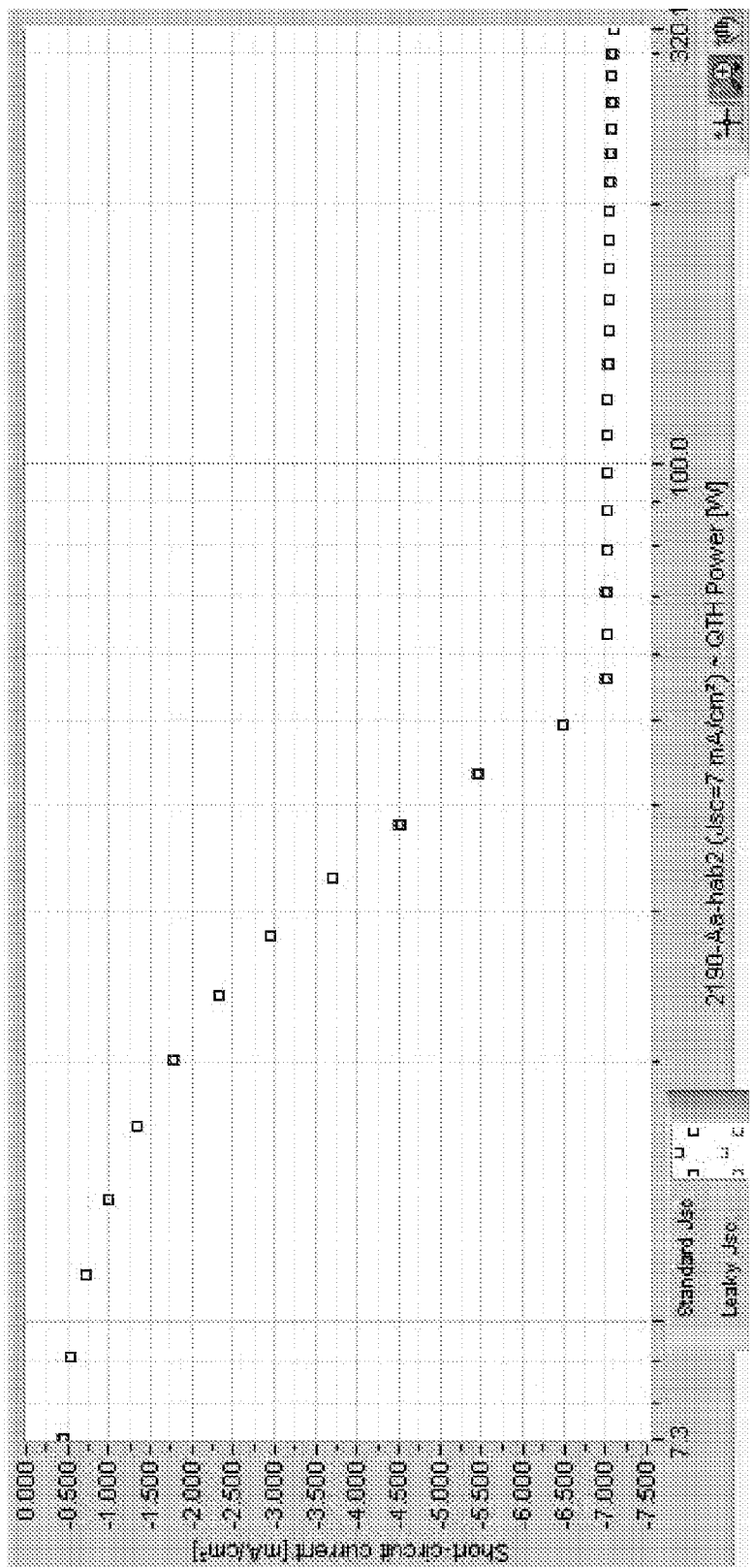
FIG. 23 shows, in accordance with the data shown at FIG. 21, a plot of short circuit current as a function the $P_{BC}$ ratio.
Figure 24:
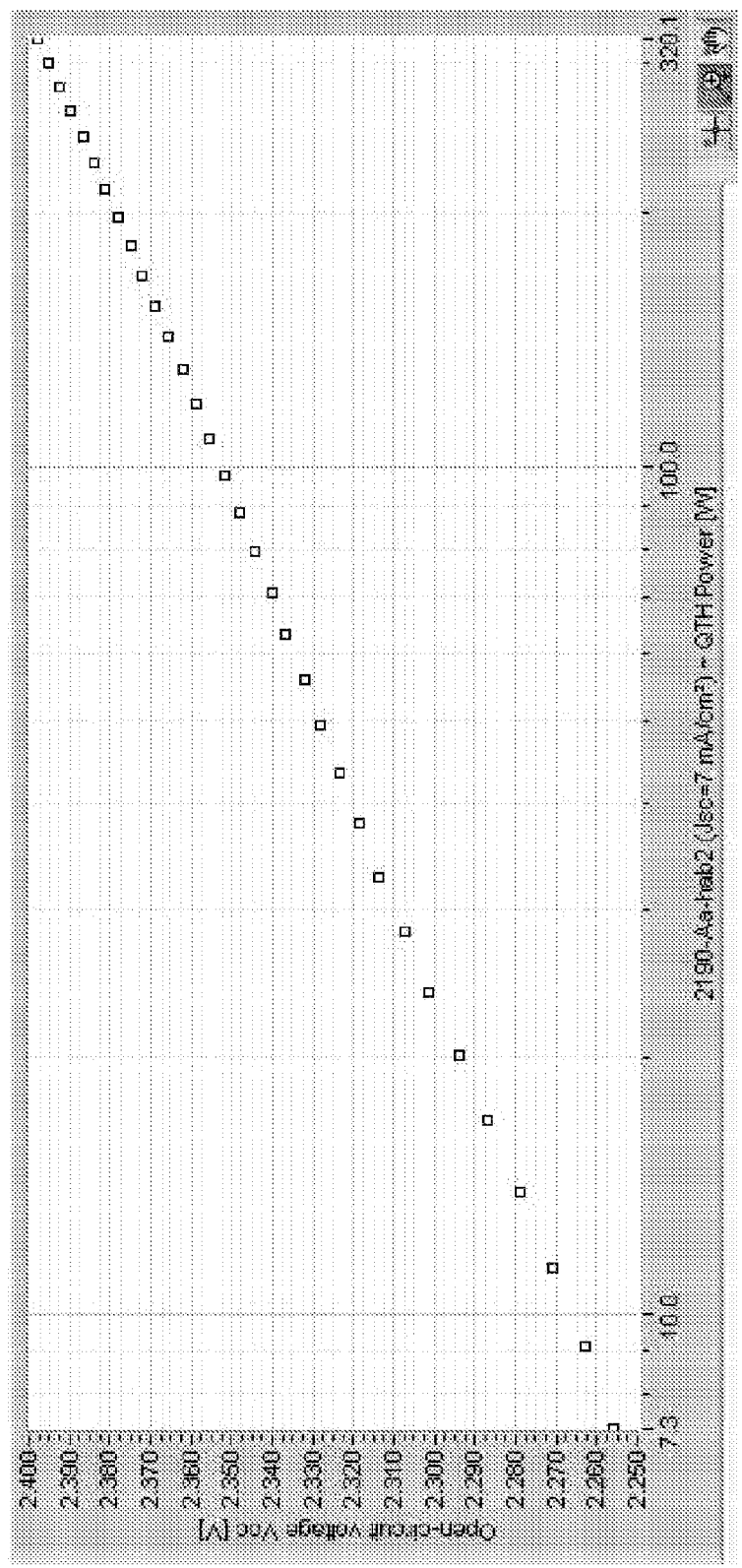
FIG. 24 shows, in accordance with the data shown at FIG. 21, a plot of open circuit voltage as a function of the $P_{BC}$ ratio.
Figure 25:
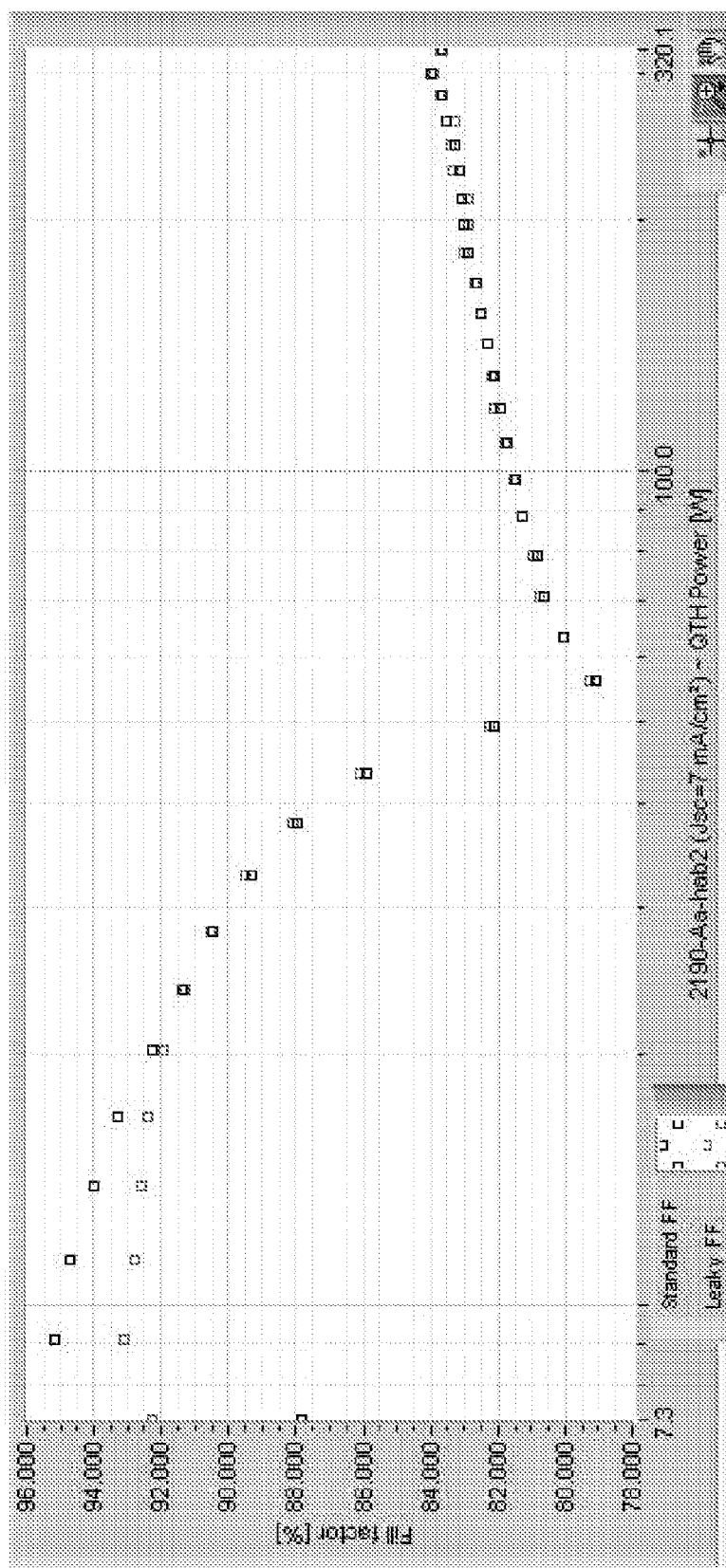
FIG. 25 shows, in accordance with the data shown at FIG. 21, the fill-factor vs the $P_{BC}$ ratio.
Figure 26:
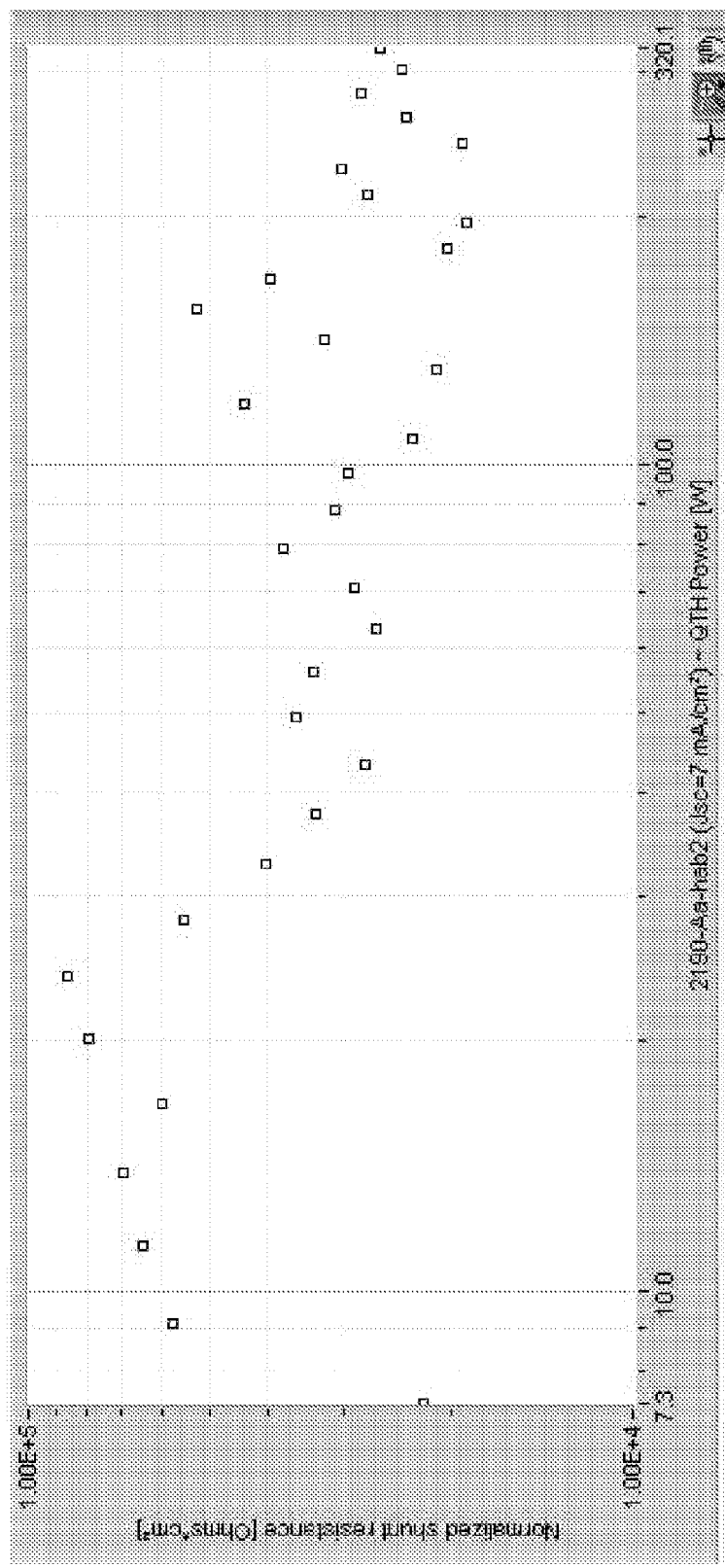
FIG. 26 shows, in accordance with the data shown at FIG. 22, a plot of shunt resistance vs the $P_{BC}$ ratio.

It is clear from FIG. 21 that in this BC sweep, the three-junction photocurrent is, as expected, clamped at −7 mA/cm². FIG. 22 is similar to FIG. 10 and shows the differential resistance ($R_{diff}$) vs V obtained from the data of FIG. 21, but obtained for a TC photocurrent of −7 mA/cm². Also obtained from the data of FIG. 21 is FIG. 23 (the three-junction solar cell short-circuit current $I_{sc}$ or short-circuit current density ($J_{sc}$) vs $P_{BC}$), which is similar to FIG. 11, but is obtained for a TC photocurrent of −7 mA/cm². It is clear from FIG. 23 that in this BC sweep the three-junction photocurrent is, as expected, clamped at −7 mA/cm². Also obtained from the data of FIG. 21 is FIG. 24 (the three-junction solar cell $V_{oc}$ vs $P_{BC}$), which is similar to FIG. 12, but is obtained for a TC photocurrent of −7 mA/cm². Also obtained from the data of FIG. 21 is FIG. 25 (the three-junction solar cell fill-factor (FF) vs $P_{BC}$), which is similar to FIG. 13, but is obtained for a TC photocurrent of −7 mA/cm². Also obtained from the data of FIG. 21 is FIG. 26 (the three-junction solar cell $R_{diff}$ vs $P_{BC}$), which is similar to FIG. 14, but now obtained for a TC photocurrent of −7 mA/cm².

The detailed description and interpretation of FIGS. 21 to 26 for the BC sweep obtained at a TC photocurrent set at −7 mA/cm² is analogous to the description given above for FIGS. 9 to 14 for the BC sweep for a TC photocurrent set at −14 mA/cm². The main difference is that clearly, as expected, the 3J photocurrent is now clamped at −7 mA/cm² as can be seen in particular in FIG. 21 or 23. As previously discussed, by repeating the MC and the BC sweeps at different TC photocurrent values, or by doing a full TC sweep with the TC and MC photocurrents set an appropriately determined value, it is possible to learn more about the TC subcell characteristics, diode properties, and overall performance.

In the design and manufacturing of multijunction solar cells, it is customary to optimize the performance in accordance with a target solar spectrum, for example ASTM G173-03 for CPV applications, or any other modified target spectrum which might take into account some transfer function due to the optics in the system, and/or other fixed differences in the target spectrum due to geographical location. For field applications, the spectral content can change significantly throughout the day, from day to day, or in different locations. Compared to the nominal target spectrum, the incident spectrum can be said to be blue-rich or red-rich depending on the latitude, longitude, time of the day, atmospheric optical density, atmospheric turbidity, etc. It can therefore be important to measure, in practice, how the multijunction cells will behave under different spectral conditions, which can overdrive or deplete the photocurrent in a particular sub-cell and, to qualitatively and quantitatively understand the related impact on performance of such color imbalance. It is important to understand the impact of such color imbalance on a particular design which has been executed according to plan in production. It is also important to understand the impact of such color imbalance on modified cell properties that can result from deviations or imperfections observed during the normal manufacturing process or in manufacturing excursions, which can result in lower quality products which might otherwise be undetected based simply on the prior art tests for characterization and/or quality control. In addition to providing proper characterization for a given target spectrum, the apparatus of the present disclosure also allows to determine the multijunction cell performance for spectral condition away from the nominal spectrum, and consequently can give a better understanding of the impact of the ever-changing spectral conditions in actual field operations.

Figure 27:
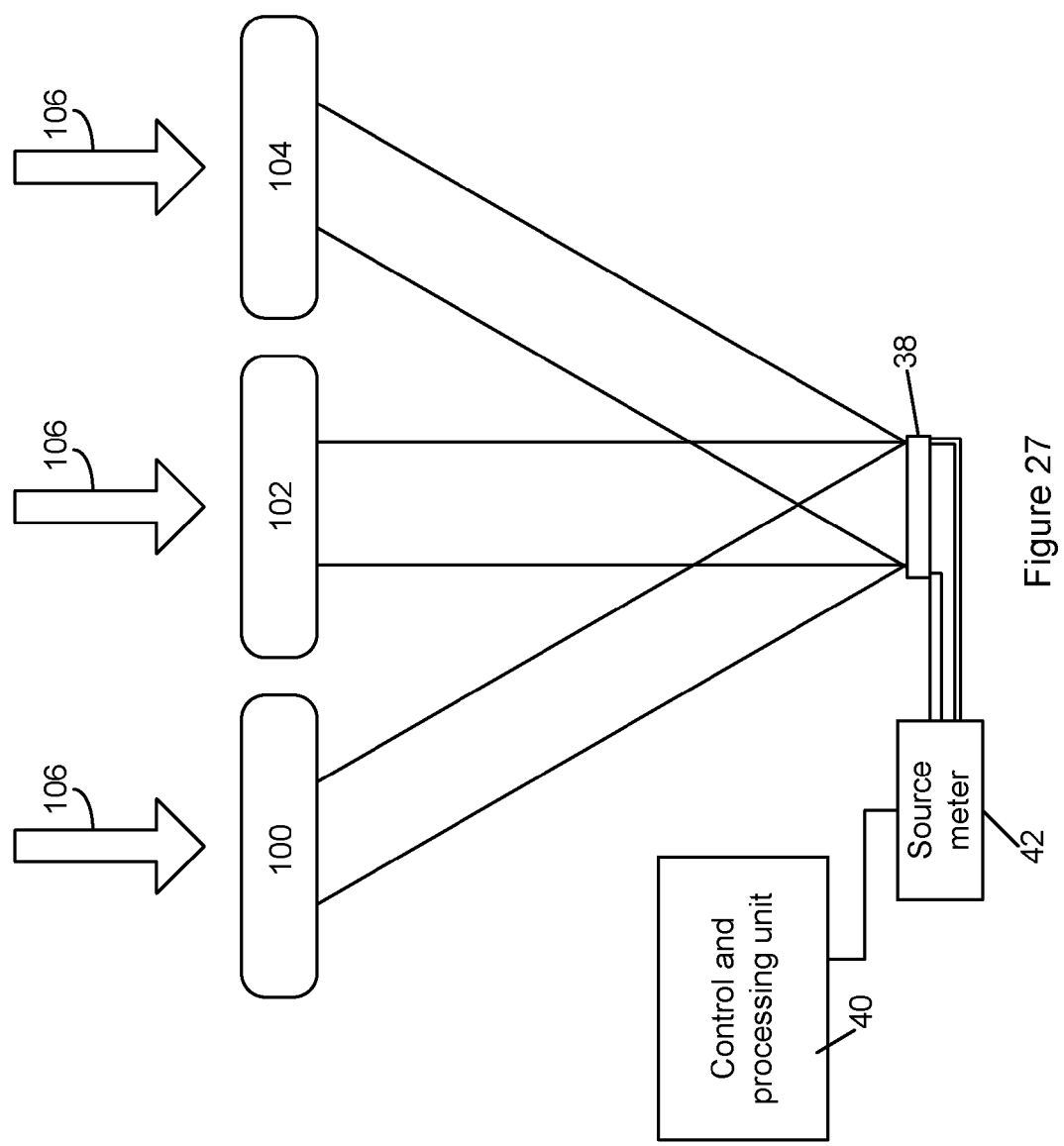
FIG. 27 shows another embodiment of the apparatus of the present disclosure.

Depending on the availability of the light sources, of the desired cost points for the apparatus, the mobility requirements for the apparatus (for example if solar cells/modules are to be characterized in the field), and the accuracy desired for the application of interest, different variations on the apparatus of the present disclosure are possible. For example, where sunlight is commonly available for the application, the exemplary apparatus embodiment of FIG. 1 can be adapted to use the sunlight as the characterization light source of the different subcells. In such and embodiment, for the exemplary three-junction solar cell configuration (solar cell 38 in FIG. 1), the TC source 46T and 48T are replaced by the sunlight captured, filtered, and collimated by optical elements such as filters lenses and/or mirrors. Similarly the MC source 46M and 48M can be replaced by the sunlight captured, filtered, and collimated by optical elements such as filters, lenses and/or mirrors. Similarly the BC source 46B and 48B can be replaced by the sunlight captured, filtered, and collimated by optical elements such as filters, lenses and/or mirrors. All of the TC, MC, BC light sources can be replaced by separate light sources generated from the sunlight or, alternatively sunlight sources can be used as complements or substitutes to any subset of the TC, MC, BC sources. FIG. 27 shows such an embodiment of the apparatus of the present disclosure. As in FIG. 1, the multijunction solar cell being characterized in FIG. 27 is a three-junction solar cell 38.

The exemplary embodiment of FIG. 27 includes filtering and beam shaping optics 100, 102, and 104 that each receive sunlight 106. The filtering and beam shaping optics 100, 102, and 104 are chosen in accordance with the spectral response of top cell, middle cell, and bottom cell, respectively, of the three-junction solar cell 38. For example, and in reference to FIG. 28, which shows a graph of transmission intensity with respect to optical wavelength, if the TC has its spectral response between wavelengths $\lambda_1$ and $\lambda_2$, the MC a spectral response between $\lambda_2$ and $\lambda_3$, and the BC a spectral response between $\lambda_3$ and $\lambda_4$, the filtering and beam shaping optics 100, can be chosen to transmit light with, for example, the spectral profile 106, which is comprised between $\lambda_1$ and $\lambda_2$. Similarly, the filtering and beam shaping optics 102, can be chosen to transmit light with, for example, the spectral profile 108, which is comprised between $\lambda_2$ and $\lambda_3$, and, the filtering and beam shaping optics 104, can be chosen to transmit light with, for example, the spectral profile 110, $\lambda_3$ and $\lambda_4$.

Typically, for the TC, $\lambda_2$ can be equal or less than 660 nm and the filtering and beam shaping optics 100 will block (by reflection and/or absorption) wavelengths longer that $\lambda_2$. Further, for a typical MC, $\lambda_3$ will be less, or equal to 880 nm, and the filtering and beam shaping optics 102 block other wavelengths (by reflection and/or by absorption). Furthermore, for a typical BC, $\lambda_4$ will be greater that 1800 nm, and the filtering and beam shaping optics 104 will block wavelengths shorter than $\lambda_3$ (by reflection and/or by absorption).

Intensity sweeping of the subcells can be effected by modifying the transmission intensity for a subcell of interest. For example, if the top cell is to be intensity-scanned and the intensity in the MC and BC is to be kept constant, the filtering and beam shaping optics 100 can be successively adjusted to have varied transmission intensities. Exemplary intensities are shown at reference numerals 106, 112, 114, 116, and 116 in FIG. 28. Any suitable variable transmission intensity filter or any suitable set of filters having various transmission intensities can be used in the filtering and beam shaping optics 100 in order to provide the varied transmission intensities.

In order to permit a wide enough range of intensity when intensity-sweeping the TC, MC, or BC, it can be helpful to concentrate the sunlight for each individual subcell. The concentration can be to any suitable concentration factor. Taking into account the optical loses in the filtering and beam shaping optics 100, 102, and 104, it can be useful to have the aforementioned filtering and beam shaping optics designed to concentrate the sunlight by a factor of 50 to 100 times to allow individual subcell sweeps between, for example, ~1/10 Sun to ~10 Suns, while keeping the other sources at ~1 Sun (i.e., ~100 mW/cm$^2$).

In this case, the optical power output at each of the filtering and beam shaping optics 100, 102, and 104 can be controlled by varying the attenuation factor of a variable attenuation filter placed in the respective filtering and beam shaping optics. Alternatively, the variable attenuation filter can be separate from the filtering and beam shaping optics and be placed in the path of the light, either before or after the filtering and beam shaping optics. The attenuation can be controlled manually or in an automated way using the control and processing unit 40 shown at FIG. 27, and/or the light source controller 44 to adjust it. Various automated elements such as a variable attenuation wheel based on neutral density filters with different optical densities, or crossed-polarizers, or liquid crystal, and/or Pockels cells, etc, can be used for the variable attenuation filters. To assist with the sunlight collection, collimation, and delivery, various wave-guiding optical elements can also be used such as multi-mode fiber, or optical rods, etc. Depending on the application, the desired concentration range can vary between less than 1 Sun and greater than 1000 Suns. When sunlight-based sources as described above are used in the apparatus, higher concentrations can readily be achieved by increasing the area on the collection side of the filtering and beam shaping optics 100, 102, and 104, and/or by increasing the concentration ratio therein (i.e., also reducing the size of the output beam). The apparatus with the sun-based sources can therefore be used to characterize the devices at higher or lower concentrations.

Figure 28:
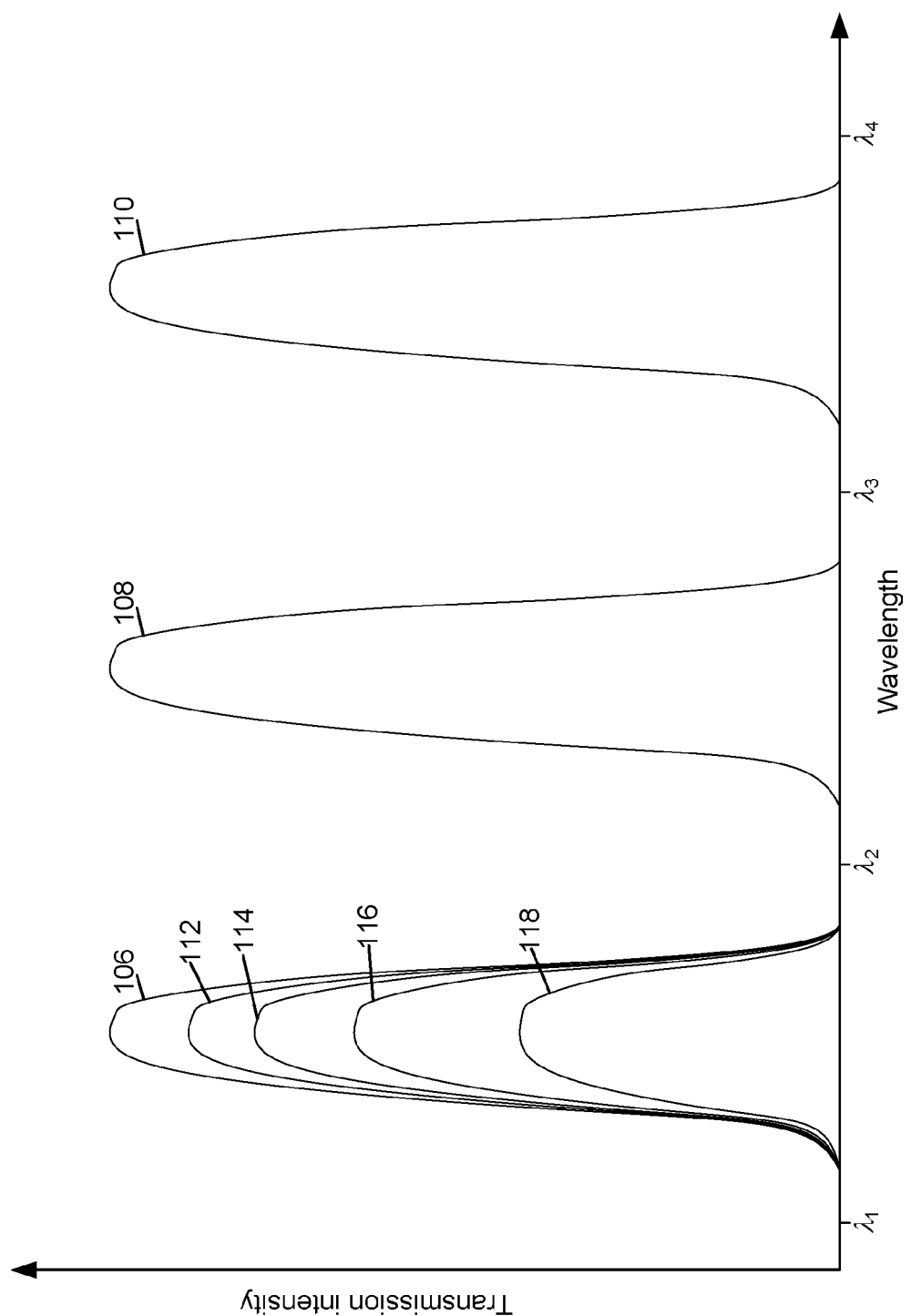
FIG. 28 shows a plot of transmission intensities related to filtering and beam shaping optics in accordance with an embodiment of an apparatus of the present disclosure.
Figure 29:
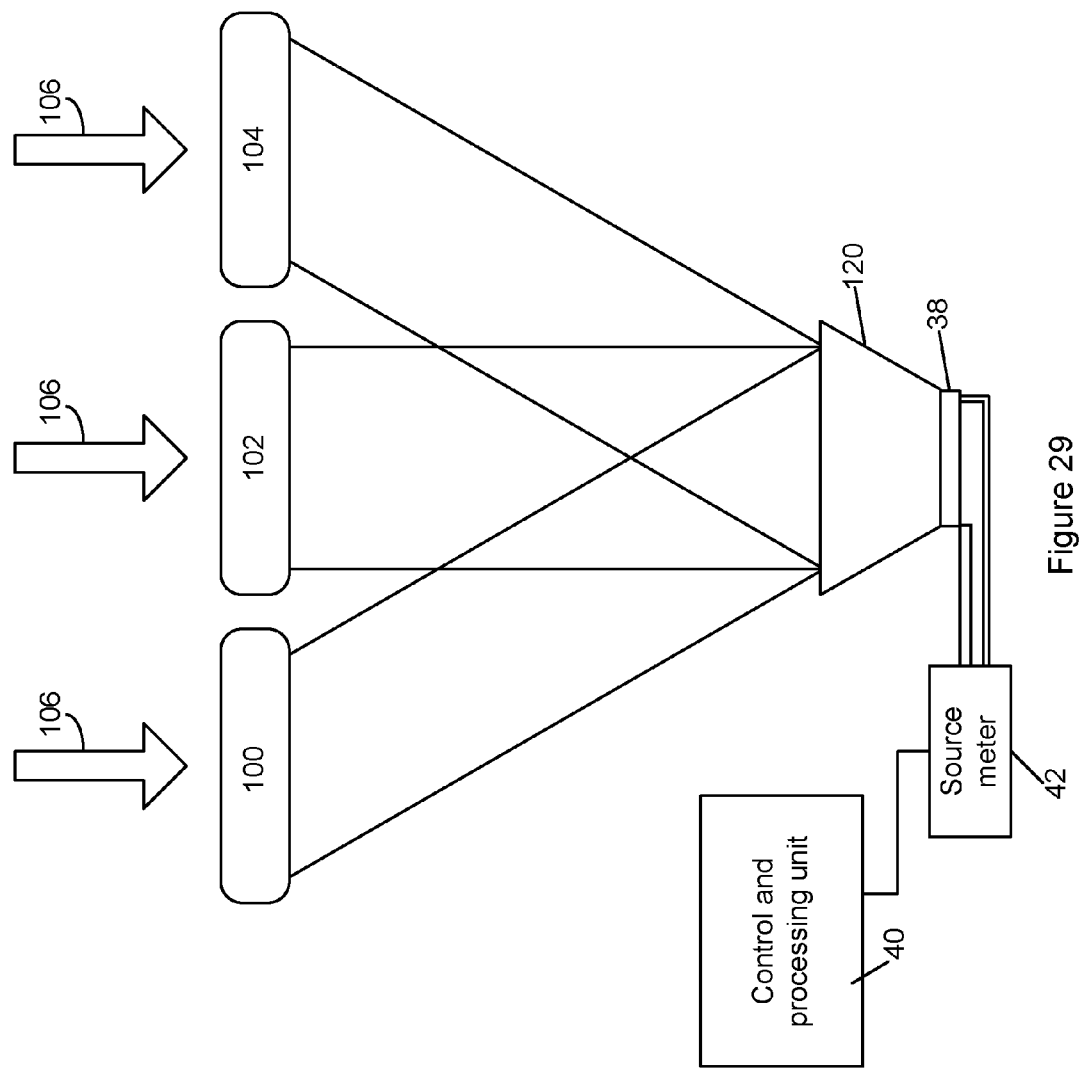
FIG. 29 shows a further embodiment of the apparatus of the present disclosure.

The apparatus of FIG. 28 can also be used to characterize a multijunction solar cell having, for example, three subcells, and concentrator optics mounted thereon. For example, FIG. 29 shows the three-junction solar cell 38 mounted to a concentrator 120. The three-junction solar cell 38 and the concentrator 120 constitute a CPV module which can be characterized the same way as the solar cell by itself.

In the exemplary apparatus embodiments of FIGS. 1, 27, and 29, the three-junction solar cell 38, or concentrator 120, receives three light beams, some of which have an angle of incidence different than zero degree. As will be understood by the skilled worker, in order to minimize measurement uncertainty, the angles of incidence of all light beams impinging on the solar cell or the solar concentrator should be minimized. This is particularly important in modules containing concentrating optics, since such modules are normally designed for light incident within a narrow cone from normal incidence (i.e. quasi-normal incidence is usually better for modules incorporating concentrating optics)

In the embodiments of FIGS. 27 and 29, instead of using the sunlight 106, any other suitable single light source can be used. Further, three similar light source could be used to respectively provide light to the filtering and beam shaping optics 100, 102, and 104.

Figure 30:
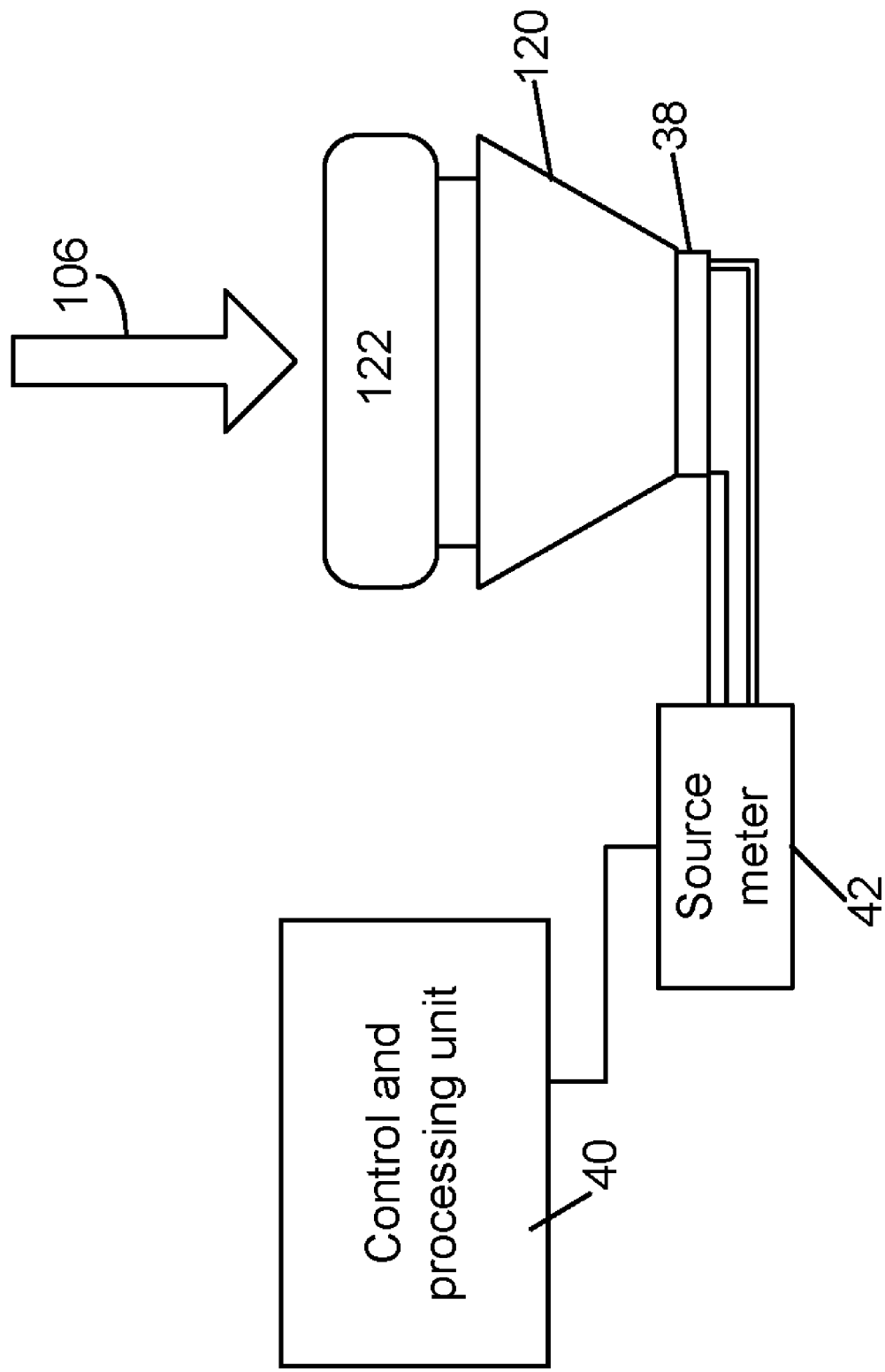
FIG. 30 shows an additional embodiment of the apparatus of the present disclosure.

FIG. 30 shows yet another embodiment of the apparatus of the present disclosure. The apparatus of FIG. 30 ensures that concentrator 120 receives light incident at approximately zero degree. The apparatus of FIG. 30 has filtering and beam shaping optics 122 which receives sunlight 106 and transmits filtered sunlight to the concentrator 120, which provided the light to the three-junction solar cell 38. As will be understood by the skilled worker, the apparatus of FIG. 30 can be used to characterize any multijunction solar cell without a concentrator.

The filtering and beam shaping optics 122 can comprise a series of bandpass filters chosen in accordance with the spectral responses of each of the subcells of the three-junction solar cell 38. The series of filters can be mounted in a frame that holds them in or out of the light path (i.e., the filters can be in ON or OFF. The sunlight transmitted through the filters in the ON position reaches the module with its spectral content modified by the transfer function of those filters. The filters in the OFF position do not affect the sunlight reaching the module. The filter positioning can be automated with some actuator controlled by a light source controller and/or a control processing unit. Alternatively manual positioning can be used to operate the filters.

As described in the previous embodiments, the different subcells can be swept in the present case by changing the filter sequence while illuminate the module with the sunlight, or another appropriate light source, in such a way that the 3J is operating with a specific sub-cell being current-limiting in a controllable way. This is accomplished by starting the sweep for example with no filters in the ON position which will produce and I-V curve with a spectrum close to the nominal sun spectrum. Progressively introducing a gradual number of filters in the ON position will attenuate the spectral content for a specific subcell in a controllable way. The sequence can then be repeated with the other 2 subcells sequentially as described in the previously embodiments.

In the case of a three-junction solar cell, in order to avoid ambiguity in the interpretation of which one of the two subcells (that are not intensity-swept) is current-limiting it is possible to produce at a low attenuation in one of these two subcells. For example using the notation (TC, MC, BC) and units of attenuation for each respective subcells such as, for example, (1,3,0) would mean the TC receives 1 attenuation unit, the MC receives 3 attenuation units, and the BC receives 0 attenuation units. An attenuation unit within a subcell spectral region can be defined to be any number between ~1% to 99% corresponding to the percentage of light intensity depleted within that spectral region. For example the attenuation units could be chosen to be roughly 5%, 10%, 20%, 25%, 33%, or 50%, or any appropriate numbers depending on the desirable trade-offs between resolution and speed of measurement.

An example of a desirable TC sweep with an otherwise current-limiting MC, using ~10% for the attenuation unit would then be: (0,1,0), (1,1,0), (2,1,0), (3,1,0), (4,1,0), (5,1,0), (6,1,0), (7,1,0), (8,1,0), (9,1,0), (10,1,0). Similarly, a MC sweep with an otherwise current-limiting TC would be: (1,0,0), (1,1,0), (1,2,0), (1,3,0), (1,4,0), (1,5,0), (1,6,0), (1,7,0), (1,8,0), (1,9,0), (1,10,0). Similarly, a BC sweep with an otherwise current-limiting TC would be: (1,0,0), (1,0,1), (1,0,2), (1,0,3), (1,0,4), (1,0,5), (1,0,6), (1,0,7), (1,0,8), (1,0,9), (1,0,10). Coarser attenuation unit steps can be used to minimize the filter cost of the apparatus and the number of filter operations necessary to complete the sweep sequences.

As explained in relation to other embodiments, even coarse sweeps can greatly improve the understanding, performance characterization, quality control, and optimization of multi-junction-based CPV modules compared to the prior art characterization methods because it allows to controllably determine which subcell is current-limiting and measure the 3J performance under these conditions. For example, the simple sequence, (2,1,0), (2,0,1), (1,2,0), (0,2,1), (0,1,2), (1,0,2), allows to characterize, in a simple way, using this embodiment of the present disclosure, the three-junction based CPV module will a well-determined sequence controlling fully which subcell is current-limiting. With an appropriate choice of the attenuation unit, the sequence will be robust to fluctuation in the sun intensity or spectral changes, since the attenuation unit can be made bigger than the sun intensity variations or the Sun spectral variations for the time it takes to complete the sweep sequence.

The attenuation units for the different subcells need not be equal, for example the BC typically has excess current for a typical three-junction solar cell and sun spectrum conditions, therefore a bigger attenuation unit can be chosen for the BC to insure that the attenuation units bring the BC in current-limiting mode as expected. The attenuation units can be calibrated to allow accurate quantitative or comparative measurements of performance and if for example the sun intensity or the direct normal insolation (DNI), and/or global normal insolation (GNI), are measured simultaneously. The apparatus for this embodiment can easily be mounted in front of a module on a sun tracker since typically CPV module need to be mounted on a tracker to follow the sun during the measurements. The attenuation filters can be made of absorbing colored glass, interference filters, or any similar appropriate filter material for the spectral range of interest. The spectral transfer function for the attenuation filters for the different subcells are as follow: the attenuation unit for the TC will transmit all sunlight except for some attenuation for wavelengths smaller than 650 nm (attenuated by reflection or by absorption); for the MC attenuation units, the filter will transmit all sunlight except for some attenuation for wavelengths greater than 700 nm and smaller than 880 nm (attenuated by reflection or by absorption); for the BC attenuation units, the filter will transmit all wavelengths except for some attenuation for wavelengths greater than ~950 nm (attenuated by reflection or by absorption).

Figure 31:
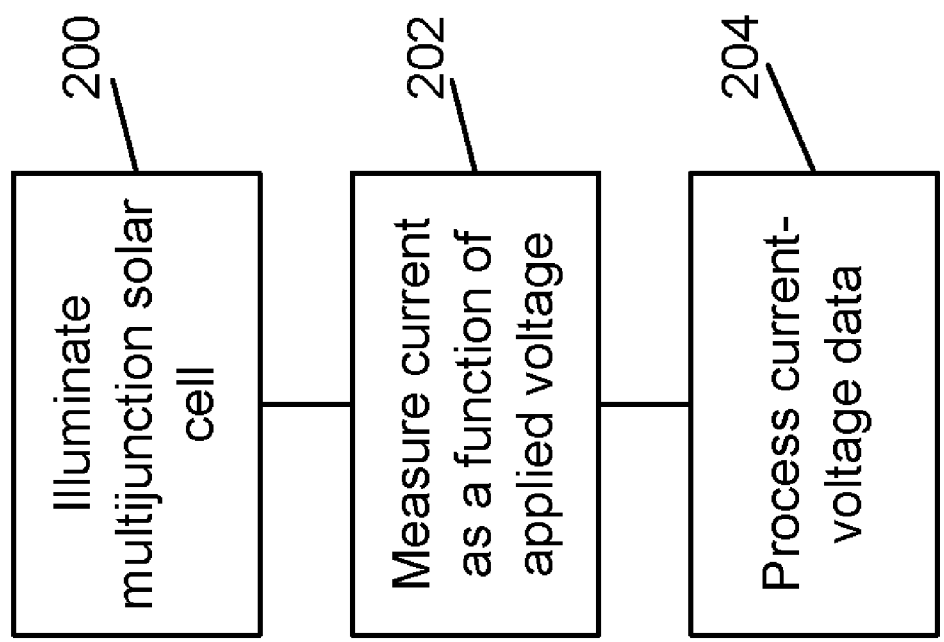
FIG. 31 shows an example of a method of the present disclosure.

FIG. 31 shows an exemplary method of the present disclosure. At action 200, a particular subcell of a multijunction solar cell is illuminated, at varied light intensities. The light illuminating the particular subcell has a wavelength range that is within the spectral response range of the particular subcell. For each of the varied intensities illuminating the particular subcell, each of the other subcells of the multijunction solar cell is illuminated, at a substantially fixed light intensity. The light illuminating each of the other subcells has a wavelength range that is within the spectral range of each of the other subcells.

At action 202, for each of the varied light intensities, a series of voltages is applied to the multijunction solar cell and the electrical current flowing through the multijunction solar cell as a function of the applied voltage is measured. The current-voltage data obtained at 202 can be displayed or, at action 204, processed to obtain further performance characteristics of the multijunction solar cell.

As previously mentioned, in addition to providing valuable characterization data, quality control tools, and advanced or more accurate diode parameters for multijunction devices, the different embodiments of the disclosure described above all offer the ability to reveal parameters which can be hidden when, for example, the prior-art test conditions do not control which subcell is current limiting the photocurrent of the multijunction device. Different plots or datasets can be used to reveal the desired information, and to assess the various parameters evaluated under different conditions which are accessible with the apparatus of the present disclosure. The fill-factor parameter (FF), the differential resistance $R_{diff}$, the open circuit parameter ($V_{oc}$), the short-circuit current ($I_{sc}$), the maximum power voltage ($V_{mp}$), and the maximum power current ($I_{mp}$) can be measured/calculated to evaluate the different subcells in terms of opto-electronic diode characteristics. The present disclosure also allows to evaluate subcell parameters such as the ideality factor (n-factor), the saturation current ($I_o$), the shunting current ($I_{sh}$), the responsivity (R), the series resistance (Rs), the reverse bias breakdown voltage, the reverse bias leakage currents, the field-induced parasitic currents, and the wavelength-integrated quantum efficiency for each subcell. The plots mentioned above were used to highlight important features of the present disclosure, but many other combinations of plots or functionality between various parameters can be explored with the apparatus without departing from the scope of the disclosure. The apparatus can include a graphical user interface which can be used to display or analyze such plots, the data can be saved in files or in databases, and the output data can be analyzed with other analysis software. The output from the apparatus can therefore be a fully analyzed summary of the parameters and merit functions of interest extracted using analysis algorithm evaluating the quantities measured with the apparatus, or any combination including the full or partial sets of data and related plots of interest.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art without departing from the scope, which is defined solely by the claims appended hereto.

What is claimed is:
1. A method to characterize a multijunction solar cell having subcells, the method comprising:
    illuminating, at varied light intensities, a particular subcell with light having a wavelength range that is within a spectral response range of the particular subcell, while illuminating, at a substantially fixed light intensity, each of the other subcells with light having a wavelength range that is within the spectral range of each of the other subcells, the particular subcell being one of the subcells; and measuring, at each of the varied light intensities, an electrical current flowing through the multijunction solar cell as a function of a voltage applied to the multijunction solar cell, the measuring to obtain current-voltage data characteristic of the multijunction solar cell.

2. The method of claim 1 further comprising displaying the current-voltage data.

3. The method of claim 2 further comprising processing the current-voltage data to obtain processed data, the processed data representing, for the multijunction solar cell, at least one of an open-circuit voltage, a short-circuit current, a fill factor, a differential resistance, a maximum power current, and a maximum power voltage.

4. The method of claim 3 wherein the processed data further represents, for the particular subcell, an ideality factor, a saturation current, a shunting current, a responsivity, a series resistance, a reverse bias breakdown voltage, a reverse bias leakage current, a field induced parasitic current, and a wavelength-integrated quantum efficiency.

5. The method of claim 1 wherein the fixed light intensity is the same for each of the other subcells.

6. The method of claim 1 wherein the light illuminating the particular subcell and the light illuminating the other subcells is collimated light.

* * * * *